United States Patent
Arora et al.

(10) Patent No.: US 10,839,557 B1
(45) Date of Patent: Nov. 17, 2020

(54) CAMERA CALIBRATION FOR AUGMENTED REALITY

(71) Applicant: A9.com, Inc., Palo Alto, CA (US)

(72) Inventors: Himanshu Arora, San Jose, CA (US); Yifan Xing, Seattle, WA (US); Radek Grzeszczuk, Menlo Park, CA (US); Chun-Kai Wang, Mountain View, CA (US); Paulo Ricardo dos Santos Mendonca, Seattle, WA (US); Arnab Sanat Kumar Dhua, Mountian View, CA (US)

(73) Assignee: A9.com, Inc., Palo Alto, CA (US)

( * ) Notice: Subject to any disclaimer, the term of this patent is extended or adjusted under 35 U.S.C. 154(b) by 244 days.

(21) Appl. No.: 15/944,690

(22) Filed: Apr. 3, 2018

(51) Int. Cl.
*G06T 7/80* (2017.01)
*G06T 7/73* (2017.01)
*G06T 7/55* (2017.01)
*H04N 5/247* (2006.01)
*G06T 19/00* (2011.01)

(52) U.S. Cl.
CPC .................. *G06T 7/80* (2017.01); *G06T 7/55* (2017.01); *G06T 7/73* (2017.01); *G06T 19/006* (2013.01); *H04N 5/247* (2013.01); *G06T 2207/30204* (2013.01)

(58) Field of Classification Search
CPC ........... G06T 7/80; G06T 7/55; G06T 19/006; G06T 2207/30204; H04N 5/247
See application file for complete search history.

(56) References Cited

U.S. PATENT DOCUMENTS

| | | | | |
|---|---|---|---|---|
| 10,026,218 | B1* | 7/2018 | Mertens | H04N 13/332 |
| 2012/0287240 | A1* | 11/2012 | Grossmann | G06T 7/80 |
| | | | | 348/46 |
| 2013/0016223 | A1* | 1/2013 | Kim | H04N 5/247 |
| | | | | 348/187 |
| 2014/0055570 | A1* | 2/2014 | Dehais | G06T 15/04 |
| | | | | 348/47 |
| 2016/0073104 | A1* | 3/2016 | Hillebrand | G01B 11/25 |
| | | | | 348/47 |
| 2016/0148433 | A1* | 5/2016 | Petrovskaya | G02B 27/01 |
| | | | | 345/633 |
| 2017/0287166 | A1* | 10/2017 | Claveau | H04N 17/002 |
| 2019/0373247 | A1* | 12/2019 | Shokri | G16H 40/67 |

* cited by examiner

*Primary Examiner* — Richard A Hansell, Jr.
(74) *Attorney, Agent, or Firm* — Hogan Lovells US LLP

(57) ABSTRACT

Approaches herein provide for multi-camera calibration and subsequent application in augmented reality applications. The approach obtains image data of a three-dimensional (3D) calibration object from different directions using the at least one camera. A determination is made for extrinsic parameters associated with a relative position of the 3D calibration object to the at least one camera. A further determination is made for intrinsic parameters associated with the at least one camera relative to the 3D calibration object facing in the different positions. Revised intrinsic parameters are generated from the intrinsic parameters. The revised intrinsic parameters provide a calibration output that may be applied to generate views of an item in an augmented reality application.

19 Claims, 10 Drawing Sheets

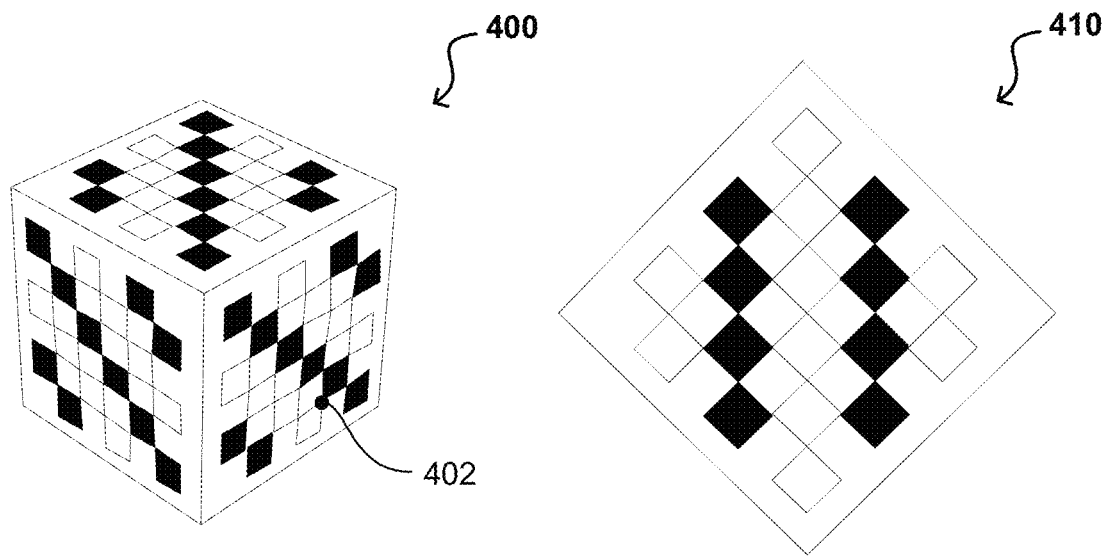
FIG. 4A
FIG. 4B
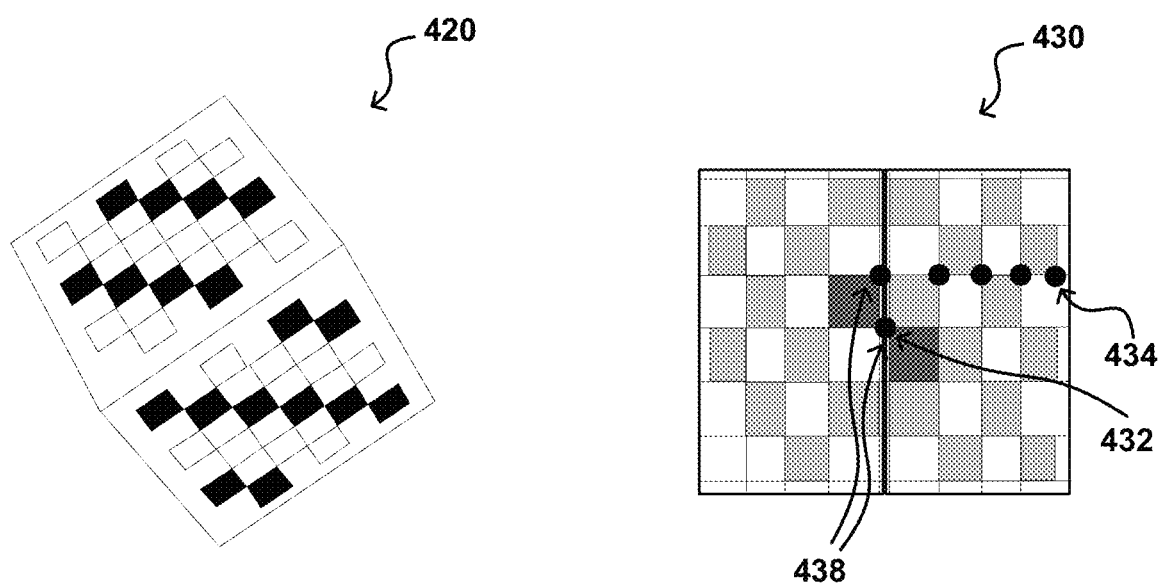
FIG. 4C
FIG. 4D

US 10,839,557 B1

CAMERA CALIBRATION FOR AUGMENTED REALITY

BACKGROUND

Products are increasingly sold on electronic marketplaces over the internet. Users of such electronic marketplaces are left with disconnect between an item displayed in the electronic marketplace and the actual item received at a user's physical location. For example, a user may have order a lamp of a particular type for an end table based at least in part on the look offered in example photos on the electronic marketplace. The physical lamp, however, once placed on the end table may offer a very different look than the user anticipated—especially when viewed in different angles. Size and shape may be a few uncertain factors influencing the user's expectations against the actual item. Augmented reality allows for some integration of a live environment with a virtual item—such as adding a virtual lamp on the end table. The physical shape and the size integrated into an augmented reality implementation of a live environment may still not resolve a user's expectation of the item's view and aesthetics in the two dimensional integration in the live environment.

BRIEF DESCRIPTION OF THE DRAWINGS

Various embodiments in accordance with the present disclosure will be described with reference to the drawings, in which:

FIGS. 4A, 4B, 4C, and 4D illustrate examples for a calibration object and faces of the calibration object with fiducial or planar markers, in accordance with various embodiments.

DETAILED DESCRIPTION

Figure 1A:
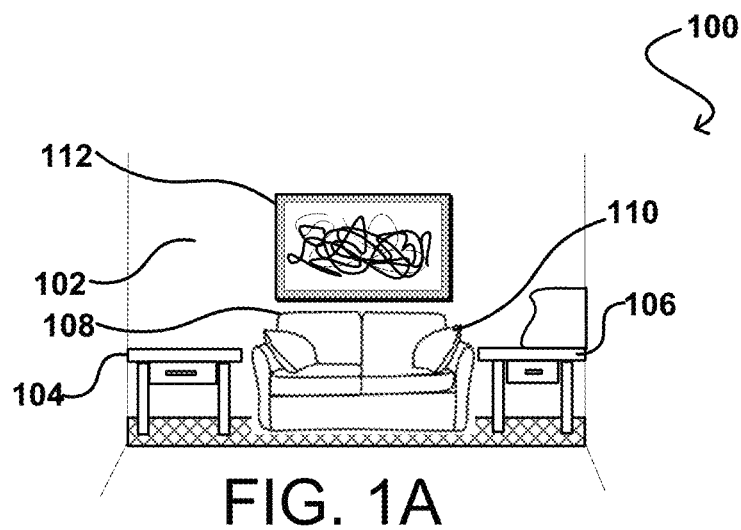
FIGS. 1A, 1B, and 1C illustrate examples of a system for providing an augmented reality view of a live environment that can utilize the present disclosure in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in approaches to capturing image information using an electronic device, to providing augmented reality applications, and for multi-camera calibration. The example approach herein relies on a known three-dimensional (3D) calibration object that is placed on a moving surface and that is subject to image capture by one or more cameras for purposes of calibration of the one or more cameras—independently or as a system. The calibration object includes known planar markers, features from which form a basis to determine a relative position and orientation mapping from the 3D calibration object to a two-dimensional (2D) image plane for the one or more cameras. The mapping also considers different relative positions on the moving surface to the one or more cameras. Once the mapping is determined, revised parameters are generated by an adjustment to parameters obtained in the mapping. The revised parameters reduce an effect of certain ones of the parameters obtained in the mapping. In an example of reduced effects of the parameters, such a process has been determined to reduce errors from re-projection of the pixels from the 2D image plane to the plane of a 2D representation of the live environment or to the live environment itself—over the same calibration object, for instance. As a result, the example calibration approach herein enables the one or more cameras to be aligned through software mechanisms, as well as through mechanical alignment, by analysis of image data and generation of revised parameters over the parameters obtained from the analysis, which results in reduction of the effect of certain approximations, like the skew and principle point, on the calibration of the cameras. The reduction in re-projection errors provides faithful reconstruction or rendering of an item captured by the calibrated cameras in different viewpoints of an augmented reality environment.

Various other such functions can be used as well within the scope of the various embodiments as would be apparent to one of ordinary skill in the art in light of the teachings and suggestions contained herein.

In an example, a system for calibration of cameras may include at least one processor, a turntable, at least one camera, and memory storing instructions for executing in the processor, which in turn enables the system to perform functions. The system uses the at least one camera to obtain image data of a calibration object that may include planar markers. The calibration object may be located on the turntable to allow the camera to obtain the image data from different positions of the turntable. A determination for extrinsic parameters is conducted. The extrinsic parameters may include a rotation and a translation associated with the planar markers of the calibration object being in the different positions on the turntable. A further determination for intrinsic parameters is performed. The intrinsic parameters may include focal length, principal point, and skew for the at least one camera relative to the planar markers of the calibration object being in the different positions. For example, coordinates of the known image points and coordinates of the known world points, along with any scale factors, are determined. QR decomposition may be applied, to the variation of a projection or a camera matrix from the above coordinates, to generate constituent matrices that may form a calibration output. The system may then generate revised intrinsic parameters from the intrinsic parameters. For example, the system may modify or adjust the intrinsic parameters to generate the revised intrinsic parameters. Such a modification may change an effect from one or more of the focal length, the principal point, and the skew on combined parameters calculated by combining the extrinsic parameters and the intrinsic parameters. For example, combined parameters of the intrinsic and the extrinsic parameters may be a variation of a projection or a camera matrix, and may include additional transformations. A determination for calibration output occurs using the combined parameters. The constituent matrices may be utilized to provide a rendering of a virtual item in an augmented reality view of a live environment. For example, the constituent matrices are used in a projective transformation to recreate the item when viewed from different angles based at least in part on the images captured by the one or more cameras in different orientations and positions after the calibration is performed.

The image data may include one or more images representing various viewpoints of an object or item that can be captured using the one or more cameras. For example, the cameras can be positioned with respect to a surface (e.g., a turntable) on which the object or item is positioned. The cameras can be associated with camera parameters, including intrinsic parameters (e.g., focal length, aspect ratio, etc.) and extrinsic parameters (e.g., camera orientation information such as a position component, a rotational component, and a translation component that defines the location and orientation of a camera with respect to a coordinate system such as a reference coordinate system). The intrinsic parameters allow a mapping between camera coordinates (e.g., coordinates in the reference coordinate system) and pixel coordinates in an image captured by a camera. A camera model, or camera parameters, can allow a mapping from the reference coordinate system to image coordinates. This is, for example, a 3D to 2D transform.

The image data may then be analyzed, for example, using a linear calibration technique or other such approach to determine an initial set of camera parameters. The initial set of camera parameters can be used to determine a global set of calibration parameters. In the situation where the surface includes a turntable, the global parameters can include, for example, a center of rotation, an axis of rotation, a step angle of the turntable, and the like. Using the global parameters, the initial set of camera parameters can be re-estimated and the re-estimated set of camera parameters can be used to re-estimate the global parameters. The process can repeat until the camera parameters can be used to satisfy a determined threshold.

Figure 1B:
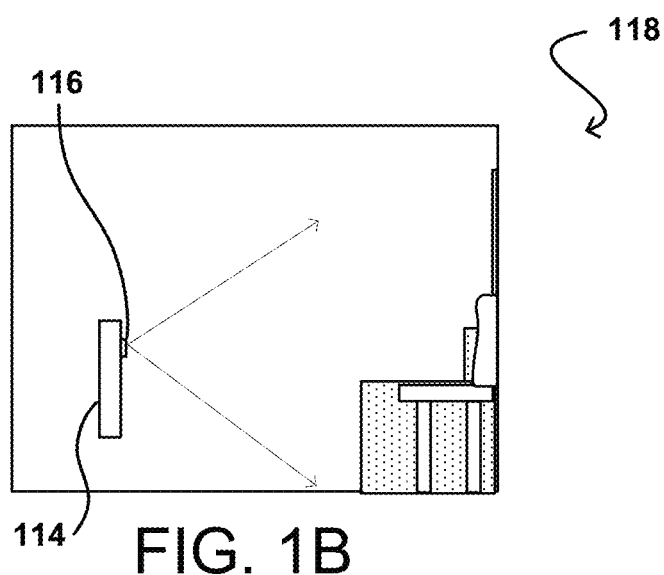
Figure 1C:
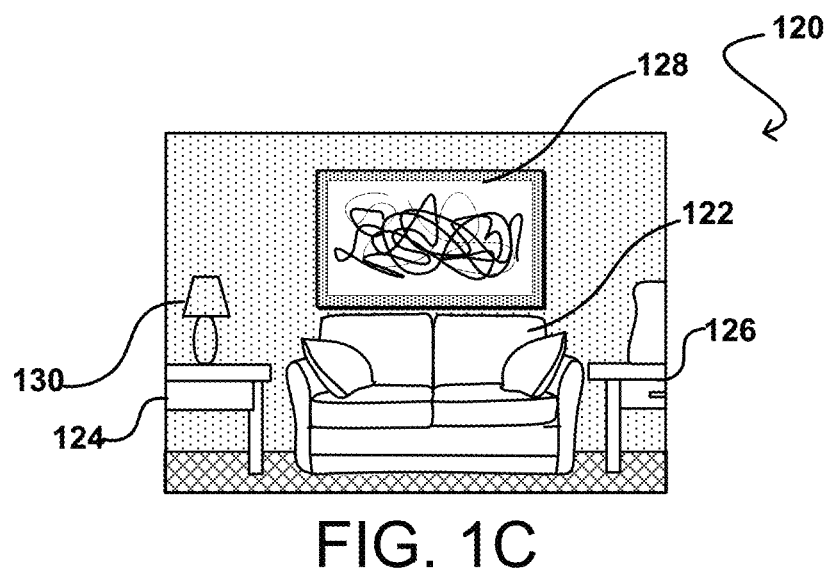

FIGS. 1A-1C illustrate an example approach for providing a live camera view representing a live environment for augmented reality application in accordance with an embodiment. FIG. 1A provides a view or scene 100 for capture using a camera or any image capture element (e.g., reference numeral 116 of FIG. 1B) of a computing device (e.g., reference numeral 114 of FIG. 1B). The scene includes objects, such as tables 104, 106, a couch 110, and a picture frame 112. Further, the scene includes ambient light, which is taken from the understanding of one or ordinary skill in the art reading this disclosure. In an example, for purposes of reference, reference numeral 102 provides a general indication of ambient light as may be understood by one of ordinary skill. The ambient light 102 is typical from any existing light source in the view of scene—e.g., any fixed light, reflecting light, or sun exposure. FIG. 1B provides a manner of usage of the computing device 114—executing an augmented reality application—for use to augment the live environment 100, 118 based at least in part on user selections made via a user interface (UI) of the computing device 114.

FIG. 1C, in an example, provides a screen view (or augmented reality view) 120, which may be the UI on a screen of the computing device 114. The screen view 120 includes a live camera view, image, or video of the view or scene 100 that the camera or image capture element 116 captures. For purposes of simplicity in this disclosure, an object is generally in reference to structures in a physical setting—e.g., tables 104, 106 in a scene or view 100. Representations of objects or, plainly, objects, as used in context of a screen view is generally in references to virtual structures or image data portions in a live camera view, an image, or a video—e.g., tables 124, 126, couch 122, and picture frame 128 in screen views 120. The augmented reality view 120 of the live environment 100, 118, however, illustrates the integration of a virtual item 130 into the live environment 100, 118 via the software features of an augmented reality application providing the view 120.

In implementations herein, representations of objects 124, 126 are presented as part of a screen or augmented reality view 120, which is a portion of a UI on a two dimensional (2D) screen. In other implementations, the screen view 120 may be the UI and may be a three dimensional (3D) UI. For example, using glasses or motion delay, the UI may be transformed into a 3D UI on a 2D surface. Such an implementation may find benefit in videos of live environments that are recorded for recreation with the augmented reality view at a later time. In a further example, augmented reality applications may allow a user to provide an overlay interface over the screen view, so that the screen view and UI appear synonymous. Accordingly, for simplicity, screen view 120 is used interchangeably with UI, unless indicated otherwise. The representation of objects 124, 126, 122, 128—including furniture, art, living features (e.g., face features, etc.), are subject to tracking, in an example, to determine applicable animation or to render graphical changes to correspond to motion-based changes to these objects. The use of additional representations of objects to a live camera view, an image, or a video is a process that enables simulation of an immersive experience in three-dimension (3D) for the representation of objects via the 2D screen of an augmented realty UI.

Although a camera 116 is illustrated, and may be stand-alone, example implementations include the camera as part of a computing device 114 (e.g., a smart phone, tablet, or portable media player) that is described in other examples, throughout this disclosure, and that can be held in a user's hands. Other types of computing devices can utilize aspects of the various embodiments as should be apparent in light of the teachings and suggestions contained herein. The computing device 114 can include multiple cameras, one located towards the top of the device—facing the user and the other towards the bottom of the device—away from the user. Cameras on the same side of the computing device 114 are also available to include the system of the present disclosure and to perform the methods described herein. Furthermore, it should be understood that, while the camera of the example computing device 114 is shown to be on a back of the device, there can be similar or alternative components on the top, side, or front of the device as well (or instead).

Further, directions such as "bottom," "top," back," "side," and "front," are merely examples and not taken to mean specific orientations unless stated otherwise. Additionally, in an example, each of the cameras that may be integrated into the computing device 114 may include a digital camera with a complimentary metal-oxide-semiconductor (CMOS) image sensor. In another embodiment, the cameras of the computing device 114 incorporates other types of image sensors, including a charged couple device (CCD), and/or can incorporate multiple cameras, including at least one wide-angle optical element (e.g., fish eye lens), that enables the camera to capture images over a wide range of angles, such as 180 degrees or more. In embodiments herein, the computing device includes one or more additional cameras on the front, back, top, bottom, or sides of the computing device, and the one or more additional cameras can capture image data facing a front, back, top, bottom, or side surfaces of the computing device. Further, the example cameras comprise a digital still camera, configured to capture subsequent frames in rapid succession, or a video camera for capture video streams. A computing device, in another example, includes other types of imaging elements, such as ambient light sensors, IR sensors, other optical, imaging, lighting, or photon-type sensors.

In FIG. 1C, the UI or screen view 120 illustrates that the added virtual item 130—a lamp—is a passive item inserted into the representation of objects; i.e., the screen view 120 of the physical view or the scene 100, 118 is a faithful reproduction of the live camera view, image, or video frame from the physical view or scene 100, 118. Indeed, the screen view 120 includes representation of the objects (e.g., tables 124 and 126 are partly representations of the physical tables 104, 106 within a focus/frame of the camera 116). Accordingly, the representations of objects, as used herein, are camera-captured versions of objects 104 and 106. The method and system herein, in an example, addresses example situations when the computing device 114 is moved around the live environment focusing on the table 124, then the lamp 130, being passive, is merely provided in the same 2D representation in each of the views as the live environment changes based on the angle of view of the camera 116. In such a situation, a user is unable to fully ascertain the item's view and aesthetics from other directions than the 2D image provided—setting aside the usefulness of augmented reality in 360 degrees of rotation.

To resolve such a situation, instead of a 2D image, 3D image data is captured for each item that may be applied to the augmented reality view and that may be scrolled in 360 degrees once integrated into the augmented reality view. To provide this, 3D imaging using at least one pair of high resolution matched cameras may be used. For example, such 3D imaging may generate image data to faithfully reproduce an item's representation or appearance by photographs or capturing the item from about 1400 different viewpoints. At runtime, using the augmented reality application, the item may be reproduced as an overlay or as integrated into the live environment from any arbitrary viewpoint. As a result, the present disclosure provides calibration for the cameras used to capture the many viewpoints so that reconstruction of the item may be provided from any arbitrary viewpoint using the original images (with some processing) and a geometric modeling of the item. Such image data may include light field models of the captured image or for calibration of the cameras. For example, to capture the image data the present disclosure provides a light field scanner, which is calibrated for successfully visualizing every provided item as a model of itself to be used in augmented reality and other virtual reality applications.

Figure 2:
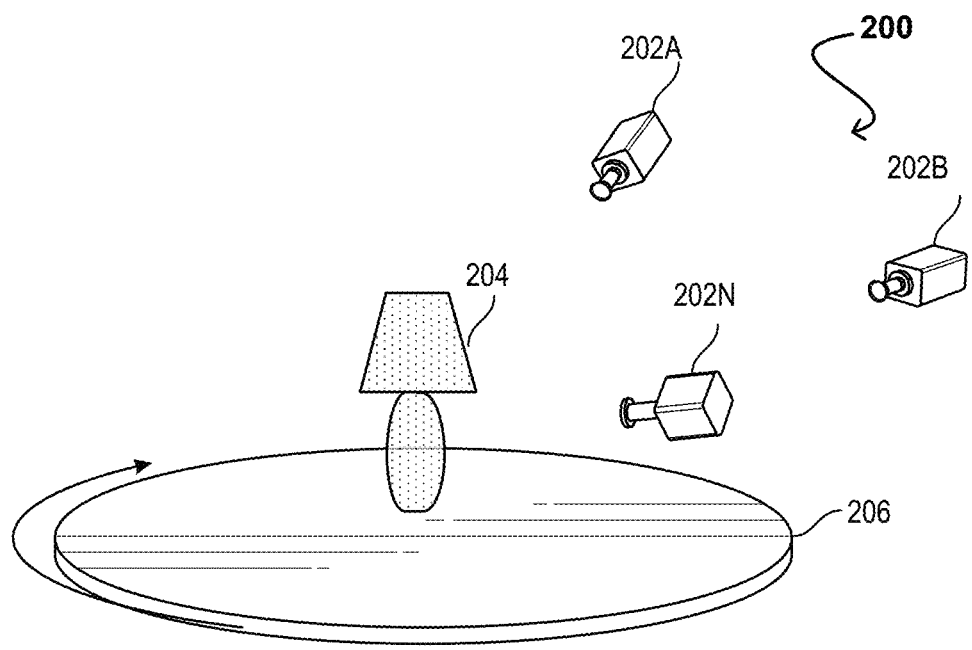
FIG. 2 illustrates an example image capture system for camera calibration purposes in accordance with various embodiments.

In an example, such a light field scanner is an image capture system that is arranged to obtain images of items from different viewpoints, as illustrated in example 200 of FIG. 2. In the example shown in FIG. 2, an image capture array 202A, B . . . N captures a number of images of an item 204. The image capture array 202 includes a number of cameras 202A, 202B . . . 202N, or includes other image capture devices, which are positioned about a platen 206. The platen 206 may be a turntable capable of rotation or other movements, and may include a circular revolving plate or other such platform. The image capture devices can include RGB cameras, RGBD cameras (RGB-Depth cameras), infrared sensors, and/or other devices. The illustrative cameras 202A, 202B . . . 202N can capture images of item 204 on the platen 206 from the different angles. Item 204 for which a 3D reconstruction is desired can be positioned on the platen 206. The cameras 202A, 202B . . . 202N may capture images of the item 204 as the platen rotates, and additional images may be captured from different viewpoints by stopping the surface 206 at specific positions that may be predetermined. The number of rotations and the number of cameras 202A, 202B . . . 202N can vary. For example, in an aspect, 19 cameras and 72 rotations can be used to obtain image data. This results in 1,368 images, one per camera per platen position, representing the image data. As noted, however, these numbers can be varied.

Further, the light field scanner in example 200 may include two sets of 19 RGB cameras placed on an articulated arm at 5 degrees difference between the cameras. Each bank of cameras can have lenses with one of the following focal lengths: 50 mm, 35 mm, and 16 mm. There may be 3 RGBD (depth) cameras installed at roughly 30 degrees, 50 degrees and 70 degrees to an installation reference. The scanned object is placed on a turntable, which makes 72 degree rotations, capturing the image data from the 19 RGB and 3 RGBD cameras each time. As a result, each scan consists of the 1,368 images previously referenced, but may also include 216 RGBD images. The image resolution may be 5 Mega-pixels and the capture time may be under 3 minutes.

Figure 3:
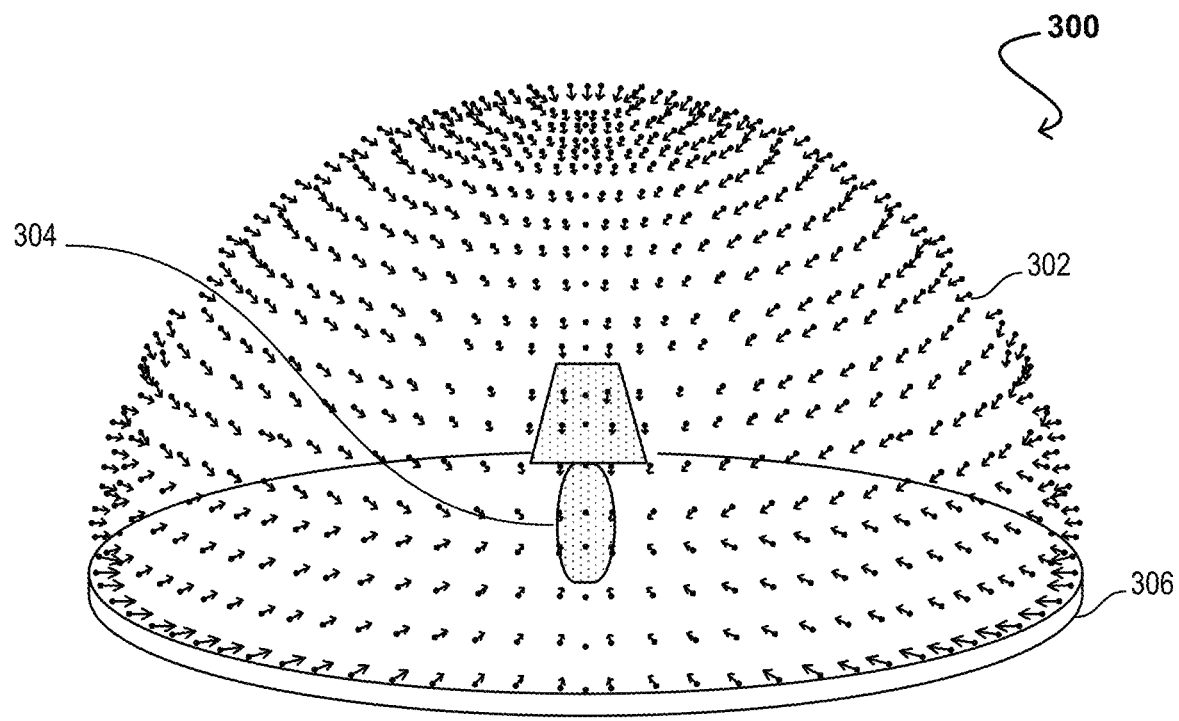
FIG. 3 illustrates a further example of the image capture system discussed in FIG. 2, for camera calibration purposes, in accordance with various embodiments.

FIG. 3 illustrates example positions at which the image data of an item is captured using the example image capture array 202 of FIG. 2. For example, the image data is in the form of different viewpoints in a hemisphere 300 about the object 304. The "density" of this viewpoint hemisphere 300, or total number of viewpoints contained, can depend on the number of image capture devices used and the number of platen positions at which images are captured. For example, in an embodiment the cameras are stationary. That is, only the item to be rendered moves during the image capture process. However, certain aspects allow for the cameras to be moved about the item 304. In the situation where the platen 306 is rotated, a first set of images is captured at an initial platen position, one image for each camera. When the platen 306 rotates to a second platen position, a second set of images is captured. When capturing image data to reconstruct a 3D representation of the item, each of the cameras captures an image at approximately the same time. An offset of the cameras may cause the location of objects in each image to be slightly offset. An amount of offset is a factor of the separation of the cameras and the distance from the cameras to the item 304. This varying offset that may include the distance, otherwise known as disparity, provides the perception of depth in the image when the images are combined using a stereovision process. In order for the image of the item 304 to have the desired appearance in the captured image(s), the cameras have to be aligned such that the item is properly positioned in each image to provide the desired depth information.

As a result, the cameras can be aligned mechanically to the extent possible and/or practical. There still can be at least some misalignment, however, such that it can be desirable to compensate for the misalignment through software and/or image processing. In order to ensure an accurate 3D reconstruction of the object, calibration of intrinsic and extrinsic parameters of the cameras with respect to a coordinate system associated with the turntable or other such reference coordinate system is desired. Some approaches for such camera calibration fail to account for constraints imposed using movable surfaces, such as turntable, or have to rely on highly complex non-linear optimization methods. For example, 2D to 3D correspondences may be simply related in a projection relation given by $x_j^i = P_i x_j^i$, where $x_j^i$ is a 2D pixel coordinates, while $X_i^j$ may be the 3D world or camera coordinates. A direct linear transform (DLT) algorithm can be used to estimate the 3×4 projection relation or matrix, which can be further factorized into intrinsic parameters and pose as Pi=Ki[Ri|Ti] using QR decomposition. The estimates here may not respect the constraints of the turntable setup, namely constrained camera motion and fixed intrinsic parameters. This method may, therefore, overfit the data to provide very low re-projection errors. However, the models created using these estimates may exhibit artifacts such as pose jitter and non-smooth camera motion.

Approaches herein provide for camera calibration of a system, such as the system in FIG. 2, where cameras are positioned with respect to an item placed on a rotating turntable. The camera calibration herein provides economical computational cost and simplicity of linear calibration approaches, while imposing reasonable constraints for a turntable setup, to the camera motion and intrinsic parameters. Such calibration allows for the reconstruction of 3D models of the items captured. In various embodiments, the calibration can include a quasi-linear camera-calibration technique that jointly optimizes camera parameters for one or more (e.g., a plurality) of cameras trained on a turntable.

In a further aspect, calibration for the light field scanner enables estimation of the intrinsic and the extrinsic parameters of camera views corresponding to all captured images. Here, the extrinsic parameters may include 6-degrees of freedom (DOF) camera pose. The 6-DOF is enabled, in one example, by the arm movement ability of the arm provided to hold the camera. The 6-DOFs may include up and down; backward and forward; left and right; pitch; roll; and yaw movements. The intrinsic parameters may include focal lengths in x and y pixel coordinates, principal point, skew, and distortion coefficients (radial and tangential).

An approach in accordance with various embodiments can use a calibration object, such as the calibration object 400 illustrated in FIG. 4A, to enable points to be located in an image (of the calibration object) captured from each camera. In various embodiments, the calibration object can correspond to a three-dimensional object. The object can include patterns, fidual markers, planar markers 410 (e.g., regions of alternating intensities or colors), which may further be data matrices (e.g., QR codes), visual codes, text, color patterns, markings, among other such salient features. The relative location of these points in each image then can be correlated to generate a set of calibration parameters, a mapping, or at least an offset, by which points in at least one image should be translated or adjusted in order to compensate for any misalignment. For example, each point 402 may correspond to a corner of the pattern 410, on a grid, and can be located in an image captured by each camera. In an example, a linear calibration procedure or other such approach can be used to determine an initial set of camera parameters. In some embodiments, an overall adjustment such as an amount of translation and/or rotation can be determined that should be applied to an image captured by at least one of the cameras. Similarly, if there is a determined translation or offset in terms of pixel values, distances, etc., at least one of the images can be shifted to compensate for the offset.

A potential problem with such an approach, however, is that in some instances a single plane of the calibration object is observed, such as the view illustrated in example 410 of FIG. 4B. In such situations, linear calibration approaches alone are not optimal as they do not necessarily account for constraints associated with a turntable setup. Accordingly, an approach in accordance with various embodiments uses a three-dimensional chessboard or checkerboard style calibration object 400. In an example, the calibration object 400 may have all markers as unique, such as from a predefined ArUco dictionary, which provides a library for augmented reality applications based in part on OpenCv support (Open Source Computer Vision Library). Such a dictionary may rely on black and white markers with codes that are detected by calling a singular functions. For robustness, each camera may include views to multiple faces of the calibration object 400. As a result, the calibration object 400 may be tilted to have a diagonal vertical while being placed on a surface. The pattern corners are detected in each image and tuples of 2D and 3D correspondences become the input to the calibration process herein.

FIG. 4C illustrates an example image 420 that can be captured of the checkerboard image using the same lens as was used to capture the grid object in FIG. 4B. As illustrated in FIG. 4C, however, different regions of the calibration object have different colors or intensities, such as may include black and white alternating squares or other such features. The edges formed between these squares can be used to correlate points in the image. The three-dimensional calibration object allows for the determination of depth information as well, as distortions and/or misalignments can potentially vary with depth or distance. FIG. 4D illustrates an example image 430 that can be captured of such an object using one of the cameras. As discussed, previously, the intensity, color, or pixel variations between features of the calibration object can be used to locate points of the grid and determine corresponding points. In this example, two of the features 438 have a different color or intensity value, such that a point 432 at the intersection of those features can be defined in each image and correlated to a point in the calibration object. The points 434 located from the intersections of the calibration object then can be correlated with respect to each other and have locations calculated and/or stored with respect to the reference point 432, which facilitates correlation among the images for the cameras.

Variations in the points can be used to remove distortions and/or misalignments through processing the captured images and reversing or otherwise accounting for the individual offsets. For example, as described, approaches herein can utilize the initial set of camera parameters to determine global parameters that may comprise intrinsic and extrinsic parameters. The global parameters can include, for example, a center of rotation of the platen, an axis of rotation of the platen, a step angle of the platen, and the like. Using the global parameters, the initial set of camera parameters can be re-estimated and the re-estimated set of camera parameters can be used to re-estimate the global parameters, and so on until desired camera calibration parameters are obtained. Thereafter, for example, an overall adjustment such as an amount of translation and/or rotation can be determined based on the camera calibration parameters that should be applied to an image captured by at least one of the cameras. In at least some embodiments, a model can be generated for each camera and/or lens that can be used to remove alignment or distortion artifacts from images captured using the camera and/or lens.

Figure 5A:
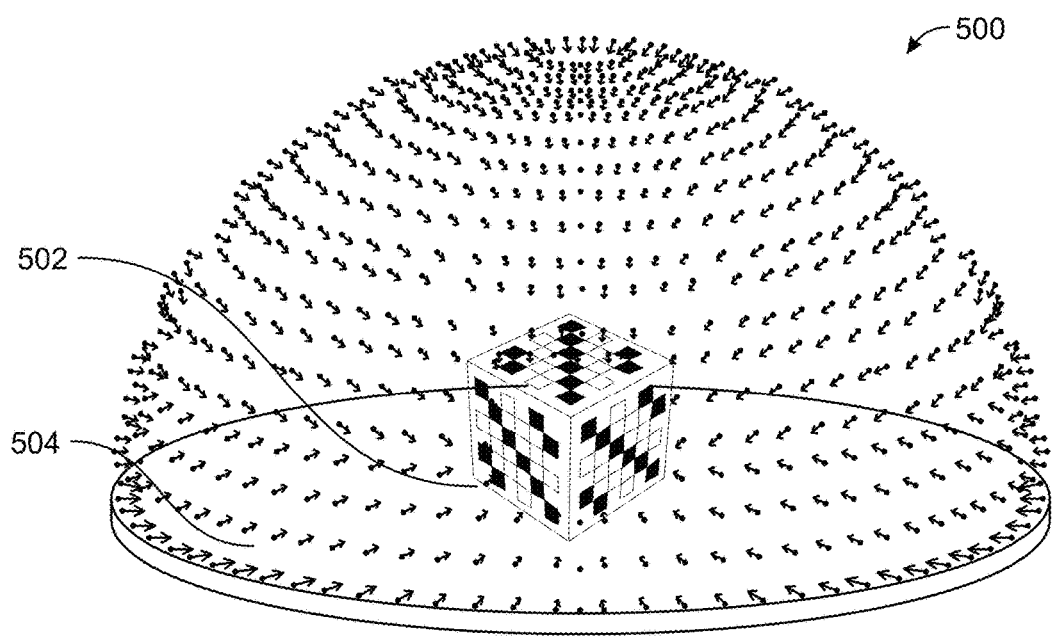
FIGS. 5A, 5B, and 5C illustrate using the calibration object and the calibration process in accordance with various aspects of this disclosure.
Figure 5B:
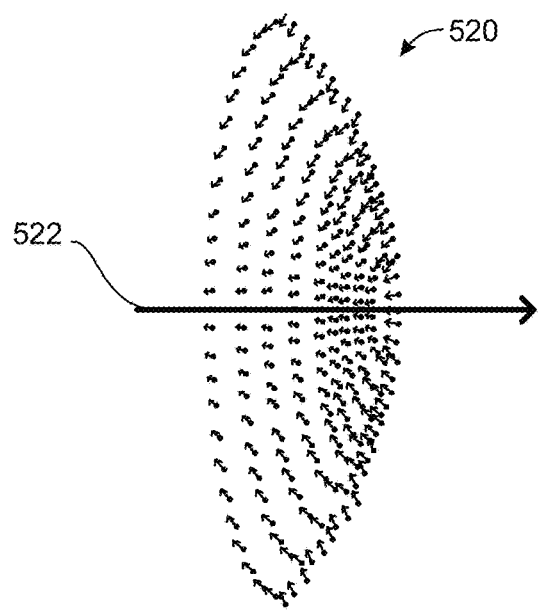
Figure 5C:
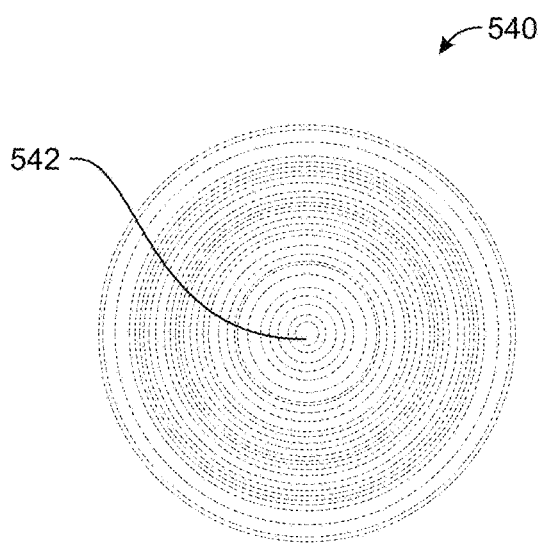

FIGS. 5A, 5B, and 5C illustrate using the calibration object and the calibration process in accordance with various aspects of this disclosure. Image data, representing a plurality of images can be captured, for example using an array of image capture devices as illustrated in example 500 of FIG. 5A (also FIGS. 2 and 3). The images can include a representation of a calibration object 502 placed on a turntable or other such surface 504 from a number of viewpoints, for example, in a hemisphere around the calibration object 502. The images can be used to determine an initial set of camera calibration parameters. However, for turntable-based systems, certain constraints can be applied and these constraints can be utilized to re-estimate the camera calibration parameters. For example, cameras perform a rotation by a common angle around a common axis, and the intrinsic parameters of each camera can be considered constant. In this way, instead of treating successive views of the turntable acquired by a give camera as if these have been in fact acquired each from an independent camera, it can be recognized that each camera performs, relative to the turntable, a rotational motion around a fixed axis of rotation of the turntable. Each camera can be assigned latitude (in coordinate axis), and successive views correspond to different longitudinal positions of the same camera. The angular interval between different longitudinal positions is the same across cameras. The rotation and translation components of this transformation bring the coordinate system of the calibration object into alignment with the coordinate system of the turntable or reference system. Accordingly, the coordinate system of the turntable has a center at the turntable's center of rotation, and an axis aligned with the turntable's rotation axis.

Once the initial set of camera calibration parameters are determined, an axis of rotation of the turntable (e.g., the orientation of the turntable's rotation axis) and a center of the turntable can be determined based at least in part on the initial set of camera calibration parameters. The axis of rotation 522, illustrated in example 520 of FIG. 5B can be determined by, for example, jointly fitting a set of parallel planes to the estimated trajectories associated with individual cameras. In one example, for a determined latitude, the trajectory of the optical centers of the cameras is confined to a plane (e.g., a circle). For different latitudes the planar domains associated with the motion each is parallel to the surface of the turntable and normal to the axis of rotation of the turntable. In this way, the set of planes are constrained to be parallel to each other, wherein their common orientation is an estimate for the axis of rotation of the turntable. As such, an estimate of the axis of rotation can be determined by fitting a set of parallel planes to the cameras optical centers.

In another example, determining the axis of rotation can include determining a rotation matrix by averaging rotations obtained between adjacent steps of the turntable on a same latitude. In an embodiment, a rotation matrix can include an axis and an angle. The rotation axis of the averaged rotation matrix can be an estimate for the axis of rotation of the turntable. In certain embodiments, a combination of the approaches may be implemented to determine the axis of rotation. In certain circumstances, the rotation of the turntable may not be known. In this situation, the initial set of camera parameters can be used to determine the angular rotation step or independent steps of the turntable. In this example, the rotation angle of the average rotation matrix can be used as an estimate for the step angle of the turntable. In another example, in the situation where the rotation step is not known to be fixed, each pair of adjacent camera positions can provide an estimate for the rotation step between those positions. The center of the turntable 542 illustrated in example 540 of FIG. 5C can be determined by, for example, fitting a sphere to the optical center of each camera to generate a plurality of spheres. One or more algorithms can be used to estimate respective centers of the plurality of spheres to determine a plurality of centers. An average, for example, of the plurality of centers can be determined. The average center can be used as the center for the turntable.

In an example, the present disclosure utilizes multiple images to eliminate the ambiguity for camera poses (positions and orientations) that only see a single plane. As such, for a captured image i=(m, n) using camera m (latitude) at turntable position n (longitude), a relative transformation matrix between two turntable positions reduces to pure rotation around y-axis. Such a rotation between 0-th and n-th turntable position may be denoted as $R_n=(R_1)^n$. Provided a further assumption that the turntable's axis of rotation is known, transformation of the 3D coordinates from calibration object's domain to turntable's coordinate system is possible using a transformation equation given by: $[R_w|T_w]$. In view of the use of a turntable coordinate system, the simplistic correspondences equation previously described as $x_j^i = P_i X_j^i$ may be rewritten as $$x_j^{m,n} = P_m \begin{bmatrix} R_n & 0 \\ 0^T & 1 \end{bmatrix} \begin{bmatrix} R_w & T_w \\ 0^T & 1 \end{bmatrix} X_j^{m,n},$$

where the R parameters provide the rotation, the T parameters provide the translation. This process relies on known values of $R_n$ and $R_w$ as the turntable positions are known. Given the relative transformation between 0-th and n-th turntable positions of the same camera, the axis of rotation and rotation angle are estimated. These estimations may uniquely determine $R_n$ and $R_w$. Multiple estimates of the axis of rotation and rotation angle may be obtained, and a median value may be used to compute their globally robust estimates.

In another example, determining the center of the turntable can include using one or more algorithms to fit concentric circles to the optical centers of each camera. The common center of the circles can be used as an estimate for the center of the turntable. For example, fitting of concentric circles to each camera's optical centers is useful to estimate axis of rotation and $R_w$. Given $R_n$ and $R_w$, linearly optimizing values of per camera $P_m$ and a global $T_w$ is available. DLT is used to estimate $P_m$ and linear least squares to estimate $T_w$. To recover the other poses of camera m, a relative rotation $R_n$ to the baseline camera matrix $P_m$ is applied.

A person of ordinary skill, upon reading the present disclosure, would understand that that, for any process discussed herein, there can be additional, fewer, or alternative steps performed in similar or alternative orders, or in parallel, within the scope of the various embodiments. The example of FIGS. 5A, 5B, and 5C demonstrate calibration of the cameras before use with 3D image capturing. Alternatively, the calibration of the cameras allow for revisions or corrections to the 3D image captured. Information about a coordinate system corresponding to a calibration object 502 is obtained. For example, the calibration object 502 corresponds to a three-dimensional object. The object can include patterns (e.g., regions of alternating intensities or colors), data matrices (e.g., QR codes, barcodes, etc.) or other visual code such as regions of different intensities, color patterns, text, markings, or salient points. Such a calibration object may be as described with reference to FIGS. 4A, 4B, 4C, and 4D.

The information about the coordinate system can include position information for the features in the coordinate system. As a result, location of the features associated with the calibration object may be known or predetermined. One or more (e.g., a plurality) of images can be captured at viewpoints 520, for example using an array of cameras as described with respect to FIG. 2. The images can include a representation of the calibration object 502 placed on a turntable or other such surface 504 from a number of viewpoints 520, for example, in a hemisphere around the calibration object 502. As the cameras capture images of the calibration object 502 for a predetermined number of angles, images captured for a respective camera can include a subset of the plurality of points. For each image, features or regions of the calibration object can be determined and points for those features determined as calibration points or reference features of the calibration object 502. For example, a feature detection algorithm can be used to detect the intersections of the colored features or regions of the pattern (see FIGS. 4A-D) on the calibration object 502. The calibration pattern can be used to correlate the calibration points, such as to determine which points correspond to respective points of the calibration object.

Positions of the features in the reference or calibration coordinate system can be identified. For example, information about the calibration object 502 can include location information in the reference coordinate system for features or regions of the calibration object 502. The location information can include coordinates in the reference coordinate system for those features. Accordingly, for a feature identified in an image, the location information for the corresponding feature on the calibration object in the reference coordinate system can be identified. In certain embodiments, location information for features of the calibration object can be stored or otherwise retained and accessed from a data store. An initial set of camera parameters can be determined based on the detected features of the calibration object represented in the image data and corresponding positions of the detected features in the reference coordinate system. For example, the initial set of camera parameters can be determined using one of a convex optimization technique or linear camera optimization technique as may include any available techniques to those skilled in the art. Such techniques can include techniques to minimize algebraic error, for example.

In an embodiment, measuring algebraic error can include using camera parameters to determine three-dimensional locations in a reference coordinate system of feature points from corresponding features in a two-dimensional camera coordinate system and comparing the determined three-dimensional locations to the actual three-dimensional locations of those features in the reference coordinate system, where the difference between the determined locations and the actual locations can be the algebraic error. The set of camera parameters can include, for example, offset values for the points accounting for intrinsic parameters (e.g., focal length, image sensor format, principal point, etc.) of a camera and extrinsic parameters (e.g., coordinate transforms from 3D world coordinates to 3D camera coordinates) of a camera, and in at least some embodiments a model (e.g., a "rectifying model") of the camera(s) capturing that image. In an embodiment, the rectifying model can include transforms or adjustments to be made to an image in order to reduce error in the image. In various embodiments, error can include, for example, misalignment error, re-projection error, algebraic error, etc.

Once the initial set of camera parameters are determined, an axis of rotation of the turntable and a center of the turntable can be determined based at least in part on the initial set of camera calibration parameters. The axis of rotation can be determined by, for example, jointly fitting using a plane fitting technique a set of planes to the estimated trajectories (e.g., normal an optical camera center) associated with individual cameras. The set of planes are constrained to be parallel to each other, wherein their common orientation is an estimate for the axis of rotation of the turntable. In another example, determining the axis of rotation can include determining a rotation matrix by averaging rotations obtained between adjacent steps of the turntable. The rotation axis of the averaged rotation matrix can be an estimate for the axis of rotation of the turntable. In certain embodiments, a combination of the approaches may be implemented to determine the axis of rotation. In certain circumstances, the rotation of the turntable may not be known. In this situation, the initial set of camera parameters can be used to determine the angular rotation step or independent steps of the turntable. In this example, the rotation angle of the average rotation matrix can be used as an estimate for the step angle of the turntable. In another example, in the situation where the rotation step is not known to be fixed, each pair of adjacent camera positions can provide an estimate for the rotation step between those positions.

The center of the turntable can be determined by, for example, for one or more of the cameras, fitting a sphere to respective optical centers of the cameras to generate one or more spheres. At least one algorithm can be used to estimate respective centers of the spheres to determine one or more sphere centers. An average, for example, of the sphere center(s) can be determined. The average center or other center determination can be used as the center for the turntable. In another example, determining the center of the turntable can include using one or more algorithms to fit concentric circles to the optical centers of individual cameras. The common center of the one or more circles can be used as an estimate for the center of the turntable.

The initial set of camera parameters can be re-estimated based at least in part on the axis of rotation of the turntable, the center of the turntable, and the step angle of the turntable. Re-estimating the set of camera parameters can include, for example, recognizing and utilizing constraints associated with the turntable setup. For example, in this embodiment, cameras perform a rotation by a common angle around a common axis, and the intrinsic parameters of each camera can be considered constant. In this way, a "global" formulation of the calibration of the camera poses can be utilized. The formulation is global in that it acknowledges constraints derived from the use of a turntable system. For example, instead of treating successive views of the turntable acquired by a give camera as if these have been in fact acquired each from an independent camera, it is recognized that each camera performs, relative to the turntable, a rotational motion around a fixed axis of rotation of the turntable. Under this formulation, each camera can be assigned a "latitude," and successive views correspond to different longitudinal positions of the same camera. The angular interval between different longitudinal positions is the same across cameras. In this way, the rotation and translation components of this transformation bring the coordinate system of the calibration object into alignment with the coordinate system of the turntable or reference system. Accordingly, the coordinate system of the turntable has a center at the turntable's center of rotation, and an axis aligned with the turntable's rotation axis.

A determination can be made whether a stopping condition exists. In the situation where a stopping condition does not exist, the process can repeat. For example, the re-estimated set of camera parameters can be used to re-estimate the axis of rotation and the center of the turntable, which can be used to re-estimate the camera parameters. In an embodiment, the stopping condition can include camera parameters that satisfy at least one threshold, for example, a difference threshold. Satisfying a difference threshold can include minimizing changes or determining a minimum or threshold change between estimates of camera parameters. In the situation where a stop condition exists, for example, a threshold is satisfied, the camera parameters can be stored as calibrated camera parameters. Thereafter, once subsequent images are captured using the array of cameras, the re-estimated camera parameters can be applied to each image to remove distortion and misalignment effects from each image before providing a three-dimensional or other image for display.

Figure 6:
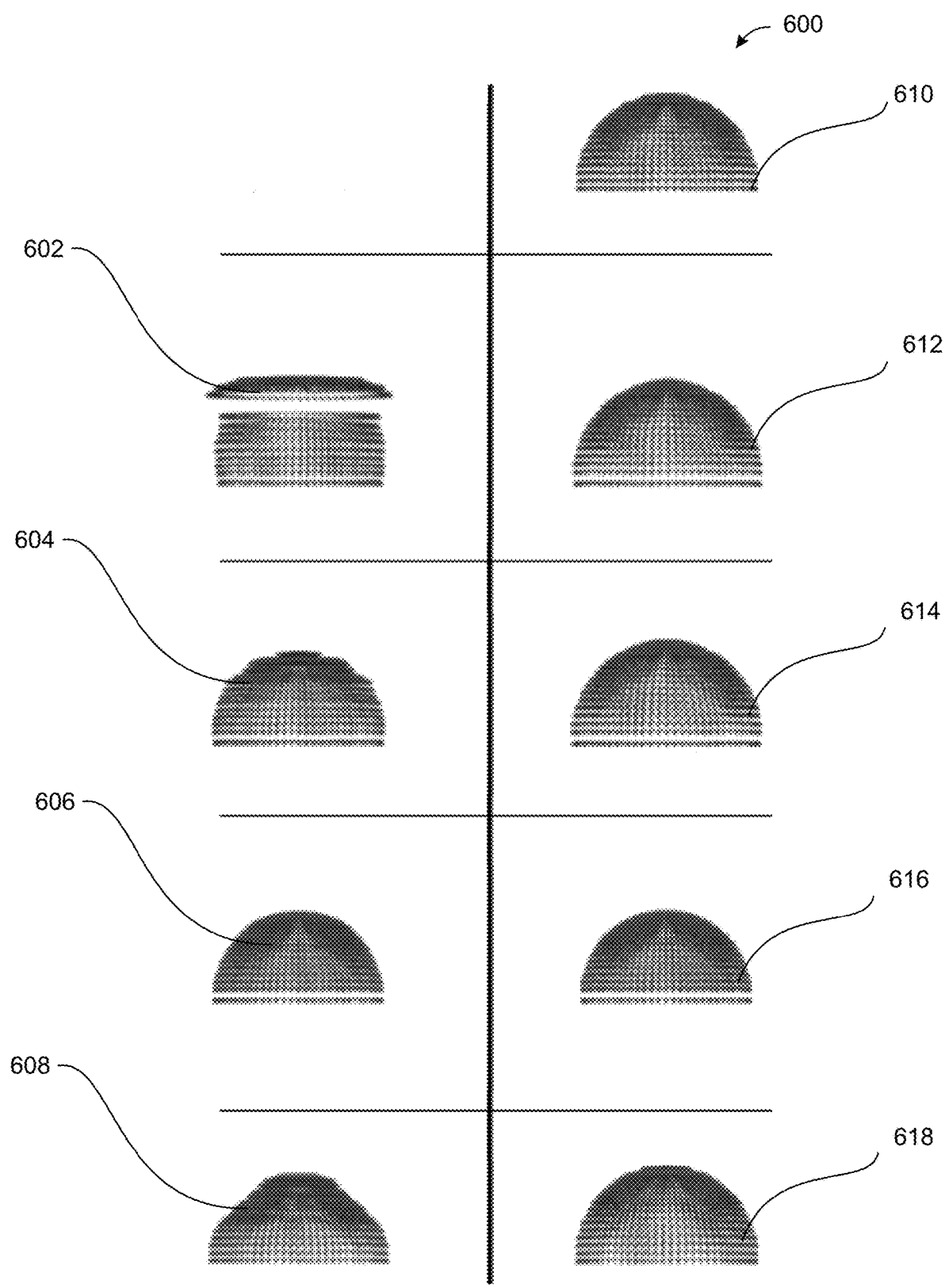
FIG. 6 illustrates example differences in calibration errors obtained from cameras calibrated in accordance with various embodiments.

FIG. 6 illustrates example differences in calibration errors 600 obtained from cameras calibrated in accordance with various embodiments. For example, QR decomposition is used to provide constituent matrices from the projection matrices, such as the intrinsic matrix or parameters and the pose matrix or parameters. As previously noted, camera intrinsic parameters consist of focal lengths and optical centers in x-y coordinates and pixel skew. These may be represented as five free parameters in a lower triangular matrix R from the QR decomposition. The present disclosure generates revised intrinsic parameters from calculated intrinsic parameters of the QR decomposition. For example, the revised intrinsic parameters may be an adjustment or modification of the intrinsic parameters so that the pixel skew may be zero and so that the optical center (or specifically, the principal point) may be the image center. In an example, a projection matrix including the extrinsic parameters and the intrinsic parameters is determined and the generation of the revised intrinsic parameters is performed from the intrinsic parameters of the QR decomposition of the projection matrix. For example, a portion of the projection matrix is inverted to provide an inverted representation. A QR decomposition of the inverted representation provides the combined parameters. As a result, once the mapping or calibration is performed or during the mapping or the calibration (as described in detailed with respect to FIGS. 5A, 5B, and 5C), revised parameters are generated by an adjustment or modification to at least skew and to the principal point is performed so that the parameters in the mapping have reduced effect to certain other parameters in the mapping. Such a process has been determined to reduce errors from re-projection of the pixels from the 2D image plane to the 3D plane of the live environment—over the calibration object, for instance. Errors in 2D image detections and 3D point definitions result in gross deviations in estimated skew and optical center, leading to overfitting, as previously described. As such, the revised parameters generated by adjustments or modifications change an effect from one or more of the focal length, the principal point, and the skew on combined parameters calculated or provided from a combination of the extrinsic parameters and the intrinsic parameters.

The rewritten equation previously described as $$X_j^{m,n} = P_m \begin{bmatrix} R_n & 0 \\ 0^T & 1 \end{bmatrix} \begin{bmatrix} R_w & T_w \\ 0^T & 1 \end{bmatrix} X_j^{m,n}$$

is, therefore, further modified or adjusted to independently estimate intrinsic values with the above described constraints. For example, $P_m$ or the projection matrix is now provided as $K_m[R_m|T_m]$. Here $K_m$, has only focal lengths as free parameters, and is estimated by averaging independent per-view estimates for each camera. Consequently, the alternate estimation procedure to optimize $[R_m|T_m]$ is modified by solving the perspective-n-point problem. The perspective-n-point problem is recognized to a person of ordinary skill reading the present disclosure and a solution is readily understood based on the disclosure herein. For the RGBD cameras, manufacturer provided information for intrinsic parameters may be applied instead of the QR decomposition values. In such an implementation, for these cameras, only estimated poses are determined. In line with the RGB calibration using the global parameters determination as previously explained, the same is applicable to the RGBD cameras, without estimating the intrinsic parameters. The poses thus estimated satisfy turntable constraints and use the provided intrinsic parameters. The poses are in the same reference frame as the RGB camera poses. Further, the calibration output may be applied to calibrate a portion of the augmented reality view associated with the at least one RGBD sensor without affecting portions of the augmented realty view associated with the RGB cameras.

FIG. 6 illustrates multiple re-projection estimates by revised parameters generated by adjusting or modifying certain intrinsic parameters 610-618 in comparison with re-projection estimates using QR decomposition parameters 602-608. Each of the rows 602, 612; 604, 614; 606, 616; and 608, 618 provide estimated camera poses on top, pixel re-projection errors for corners at 50 percentile, 70 percentile, and 90 percentile on bottom. The testing of the above-referenced adjustment or modification of parameters based on fiducial or planar marker image sequences were evaluated by measuring the re-projection errors and by visualizing the pose hemisphere. As illustrated in FIG. 6, the re-projection errors are mapped for projected 3D corners onto images using estimated intrinsic parameters and poses. Thereafter, deviation is computed from originally detected corners to the projected corners. For each sequence, errors at 50-th, 70-th and 90-th percentile are provided in FIG. 6. The independent per-view calibration has the lowest re-projection errors, but the pose hemisphere is not regular for many sequences, which eventually result in jitter during visualization. While camera calibration using Q and R values determined by QR decomposition respects circular regularity constraints, they may not estimate per camera radius correctly. This makes reliance on pure Q and R values unstable and sensitive in terms of convergence properties, and may result in higher re-projection errors. However, using modification or adjustments to certain intrinsic parameters, such as a skew and principal point, achieves best performance as demonstrated in pose hemisphere and re-projection errors distributions in reference numerals 610-618.

The present models have demonstrated reduction in many of the above errors, including re-projection error, triangulation error, and scale error. As discussed previously, a re-projection error is a pixel deviation between a detected corner of a fiducial (e.g., planar marker) of the calibration object and the projected location from its corresponding 3D point in the fiducial object. An aggregate may be determined, such as by performing a root-mean-square among all detected checkerboard corners in each image, and by taking the 50-th, 75-th and 90-th and 100-th percentile across all sequences of images captured, such as in FIGS. 3 and 5A-5C. The triangulation error is determined using a reconstruction of the 3D point of each corner of the fiducial from multiple views. Then a displacement from the corresponding 3D model point is computed. As a purpose of the calibration is to produce accurate light field models in the end-to-end workflow for a variety of applications including AR and VR, the triangulation error serves as a proxy for the calibration ability to provide accurate 3D reconstruction. As in the case of the re-projection error, the triangulation error is evaluated for various percentiles across all corners of the calibration object and across the sequences of images captured. A scale error measures the percentage deviation of each checkerboard block's length in a reconstructed fiducial object from a corresponding checkerboard block's length in the model object. The scale error indicates the overall accuracy for scale estimation, for example. In a turntable application, the scale error may be evaluated over a mean and a standard deviation among all blocks in the sequences of images captured.

In an example application of the present calibration against a baseline calibration, the present calibration showed reduced errors at least to the above three metrics. The baseline calibration first estimated the intrinsic parameters and poses for each camera view independently, and applied joint optimization to take into account certain constraints in the hardware setup. However, the present calibration uses the relative position and forced changes in at least the skew and principal points for the cameras. The present calibration is, therefore, able to meet the intended hardware specifications for each camera of the hardware setup to at least 99% of the intended hardware specifications in each camera. The intended hardware specifications may be provided by manufacturer to enable faithful reproduction of objects in captured images. Table 1 provides an example comparison of the results on the present calibration of the sequences of the images captured against those of the baseline method. Particularly, the example metrics in Table 1 demonstrates that the metrics for the baseline method fail to converge, while the metrics for the present disclosure improves all the metrics from the baseline method. In Table 1, it was observed that the baseline method failed to converge at least 6 sequences of images leaving 6 non-converging sequences of the images; while the present method converged all available sequences of images.

TABLE 1

| Error Metrics | | Baseline | Present Method Without Non-linear adjustment | Present Method |
|---|---|---|---|---|
| Re-projection Errors | $50^{th}$ | 5.47 | 2.60 | 1.58 |
| | $75^{th}$ | 8.24 | 3.22 | 2.01 |
| | $90^{th}$ | 13.65 | 3.88 | 2.39 |
| | Max | 75.86 | 37.53 | 3.84 |

TABLE 1-continued

| Error Metrics | | Baseline | Present Method Without Non-linear adjustment | Present Method |
|---|---|---|---|---|
| Triangulation Errors | $50^{th}$ | 1.65 | 0.67 | 0.39 |
| | $75^{th}$ | 2.66 | 0.90 | 0.52 |
| | $90^{th}$ | 3.99 | 1.16 | 0.66 |
| | Max | 23.47 | 2.72 | 1.86 |
| Scale Errors | | −0.15 ± 0.74 | −0.34 ± 0.25 | −0.31 ± 0.24 |

The non-linear adjustment in Table 1 is applied in an alternative embodiment to directly minimize the re-projection error further or to further include physical constraints of the system (e.g., of the physical cameras being rigidly attached). The alternative embodiment further modifies intrinsic parameters to reduce the re-projection error generally obtained as previously discussed, including with respect to FIG. 6. For example, such an alternative embodiment provides a new re-projection error using a difference of the observed 2D position of each feature in individual corresponding cameras, and known projection values of the individual corresponding cameras at a point of affixing of the individual corresponding cameras with respect to other cameras in the system. Euclidean transformation may be used to parameterize the point of affixing of the individual corresponding cameras, such as using the calibration pattern. For example, the point may be incorporated into an Euclidean transformation from a calibration pattern's coordinates—e.g., an arbitrary coordinate, w, to the 0-th camera at turn table position n. This provides a first rotation and first translation for the calibration pattern's coordinates for the point of affixing of the individual corresponding cameras.

Subsequently, the Euclidean transformation incorporates the first rotation and the first translation into a second rotation function from the 0-th camera at the turn table position n to the point of affixing of the individual corresponding cameras. The Euclidean transformation also incorporates, with the second rotation, a second translation from the 0-th camera at the turn table position n to the point of affixing of the individual corresponding cameras. The above determinations of the first and the second rotations for a combination of all the individual corresponding cameras as incorporated into single minimizing function, along with the observed 2D positions of each feature in the individual corresponding cameras. In an example, the minimizing function may be Levenberg-Marquardt algorithm, which one of ordinary skill would understand to provide a minimization for the inputs provided. The above parameterizing of the re-projection error from the observed 2D positions of each feature in the individual corresponding cameras provides estimation for single camera-to-camera transformation for each camera in the hardware architecture illustrated in FIG. 2. This also provides estimation for single camera-to-model transform for each rotation of the platen in FIG. 2. Furthermore, as the first and the second rotational parameters, referenced above, are expressed as rotation matrices and thus over-parameterized, a tangent-space quaternion parametrization ensures representation of rotation in the individual corresponding cameras using the minimal degrees of freedom.

Table 1 demonstrates error metrics from the baseline method, from the present turntable method with an applied non-linear adjustment, and from the present turntable method without the applied non-linear adjustment. In either case of the present methods, the error metrics demonstrate reduction compared to the baseline method and converges the sequences of images. For example, in the turntable method uses global intrinsic calibration and improved calibration target detection to improve reliability for cameras with extremely narrow fields of view. Then, scanner specific constraints were applied, including turntable estimation and an improved parameterization of the system to impose system specific geometric constraints on the calibration. The alternative aspect provides a further improvement by application of the non-linear adjustment for computation of a final optimized calibration.

An evaluation of the above methods may include assignment of severity scores to each of 9 common human-perceivable error types. For calibration purposes, however, instead of monitoring all the error metrics, a calibration model may be considered for application if there are no marked observations for any artifact within an particular error metric expressed as an "image shift." An image shift describes a jump in model appearance between adjacent viewpoints. This may be from inaccurate camera pose estimation, and can therefore be fully attributed to calibration errors, including the error metrics discussed herein. Table 2 illustrates example pass rates for the above methods of the present disclosure versus the baseline method. The "image shift" artifact may be eliminated from generated models incorporating the present disclosure methods. This indicates benefits of an end-to-end workflow from the present calibration improvements. The pass rate provided in Table 2 is for generated light field models of 50 objects captured by the example present system of the camera and the turntable. In the evaluation for the pass rate, only those images (for the 50 objects) are considered as passing if there is not demonstrated image shift in each case using the above-disclosed methods versus the baseline method.

TABLE 2

|  | Baseline | Present Method Without Non-linear adjustment | Present Method |
| --- | --- | --- | --- |
| Pass Rate | 34% | 82% | 78% |

Figure 7:
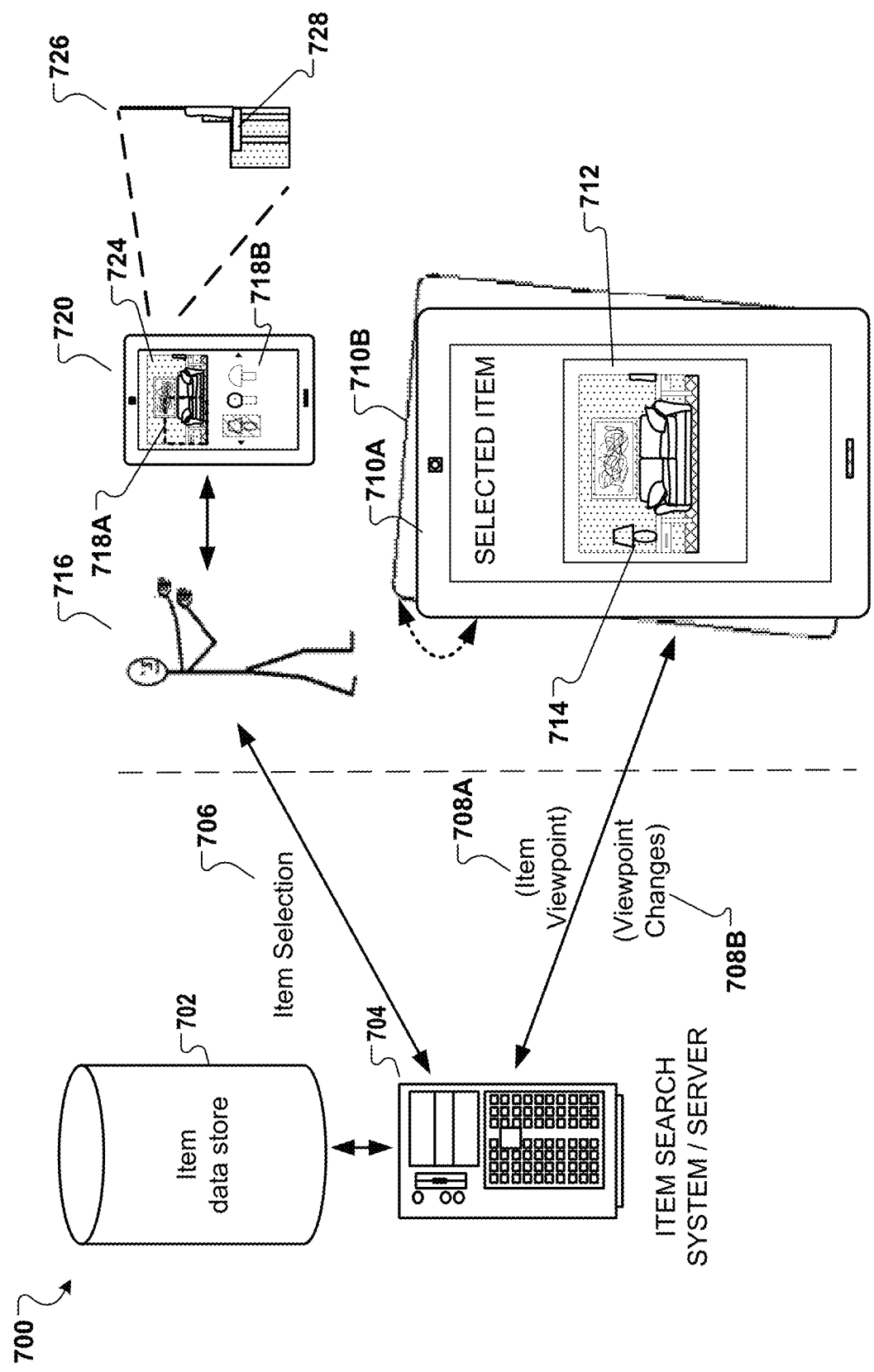
FIG. 7 illustrates an example usage of camera calibration in augmented reality applications, in accordance with an aspect of the disclosure.

FIG. 7 illustrates an example usage 700 of camera calibration in augmented reality applications, in accordance with an aspect of the disclosure. In an example, the network architecture includes at least a computing device 720 (also reference numerals 710A & B), at least an item search server or system 704, and item data store 702. Each of the computing device 720 and the server or system 704 may include at least one processor and memory including instructions that the at least one processor executes to perform processes described in this disclosure—for calibration of associated cameras on the system/server 704 side, or for augmented reality display on the computing device 720.

In an aspect, a user 716 interfaces with a camera application configured for augmented reality view 724 on the computing device 720. The user 716 may select an item 718B from an electronic marketplace for review with the augmented reality view 724 of the live environment 726. For example, when the user 716 indicates an interest in desk lamps, multiple desk lamps 718B are provided as a separate application or as part of the augmented reality view 724 for arrangement in a determined area of the augmented reality view 724 of the live environment 726. Reference numeral 718A is to a determined area—the table beside the couch—representing the intended physical location (e.g., corresponding to table 728 of the live environment 726) for the desk lamp. Furthermore, a lamp may be selected and such a selection may result in a highlighting to the selected lamp. One or both of the selection and live view may be provided 706 to the server/system 704. The server/system 704 communicates with the item data store 702 which may have image data for the item stored. The image data may include the calibrated versions of the image information as obtained from the calibrated camera arrangement of FIG. 2.

Server/system 704 provides an item viewpoint 708A to the computing device—illustrated as reference numeral 710A. A person of ordinary skill would recognize, upon reading the present disclosure, that a second computing device 710A is only provided to demonstrate the flow of actions, but that the computing device 710A is the same as computing device 720, with an updated UI from the interaction with the user requesting the lamp for augmented reality viewing. The received item viewpoint 708A may be based in part on a current viewpoint provided with the item selection at flow 706, but may also be a default viewpoint for the item. Once received in computing device 710A, the received item viewpoint is rendered as an overlay or integrated into the augmented reality view 712 of the live environment 726. As illustrated, the lamp 714 is a representation of the lamp—as the item viewpoint—provided as part of the scene (augmented reality view 712) including the live environment. When the computing device 710A is moved to a different viewing position—e.g., reference numeral 710B illustrates a changed position of the computing device—then the present disclosure provides for viewpoint changes to be provided 708B to the server/system 704. An updated item viewpoint is provided 708A back to the computing device in the position illustrated by reference numeral 710B. Alternatively, multiple item viewpoints are provided to the computing device and select ones of the multiple item viewpoints render in the augmented reality view 712 as the computing device 710A is moved to different positions such that a related camera of the computing device 710A captures a different position or orientation of the live environment 726. In an example, the computing device 710A (720, 710B) includes an orientation sensor that senses the orientation changes to the computing device and selects to change the item viewpoint to match the displayed augmented reality view 712 of the live environment 726.

Figure 8A:
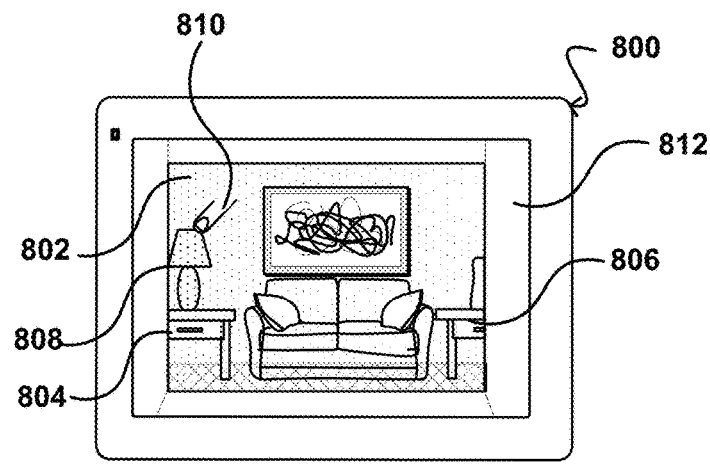
FIGS. 8A, 8B, and 8C illustrate a further usage of camera calibration in augmented reality applications, in accordance with an aspect of the disclosure.
Figure 8B:
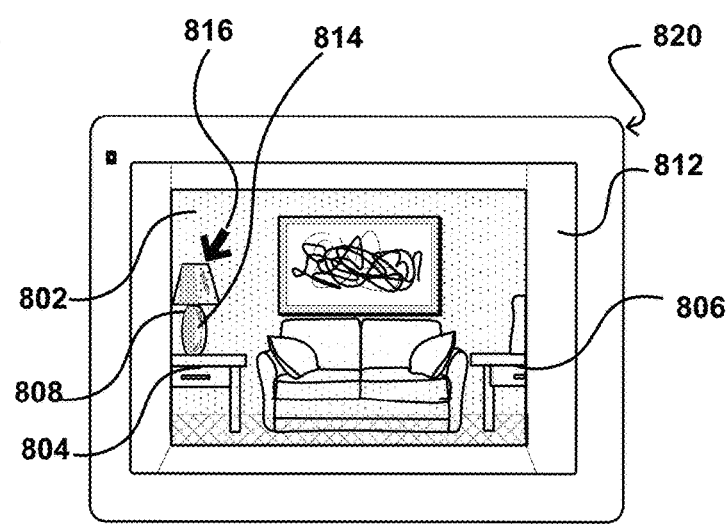
Figure 8C:
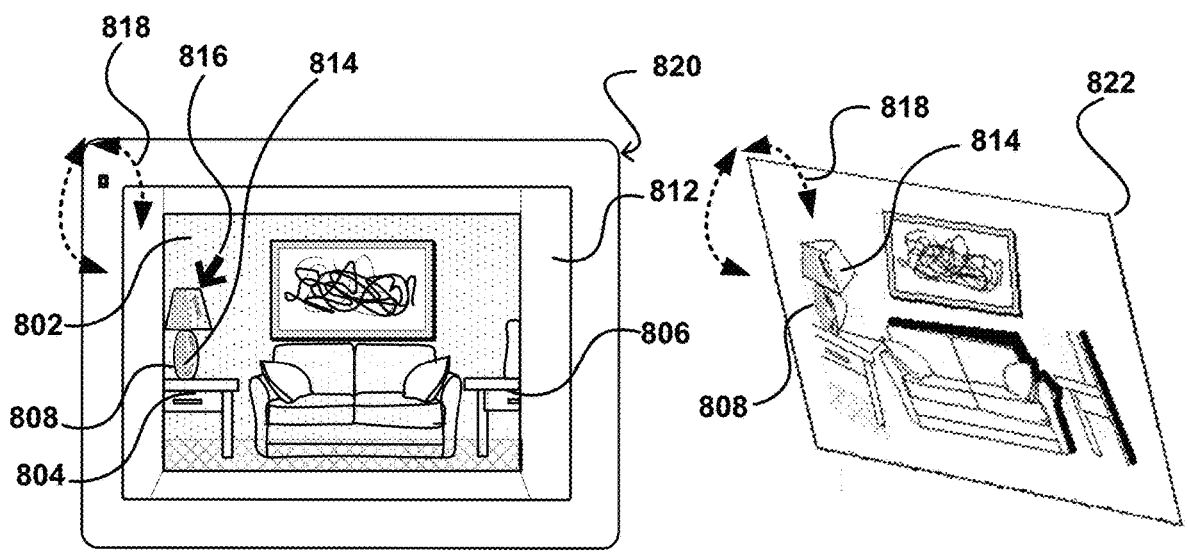

FIGS. 8A, 8B, and 8C illustrate a further usage of camera calibration in augmented reality applications, in accordance with an aspect of the disclosure. In the computing devices 800 and 820, an augmented reality view 812 is provided of a live environment. As described previously, in addition to a live environment, the augmented reality view may be of a stored image or stored view. In FIG. 8A, a virtual item 810 is placed 810 by the user into the augmented reality view 812. The item 808 is placed on table 804, and the augmented reality view 812 may include other objects (e.g., table 806) providing representations of the live environment. Reference numeral 802 indicates ambient environment lighting, color, or shading that may exist in the augmented reality view 812. FIG. 8A may be a 2D augmented reality view where the item 808 does not change to reflect different viewpoints even if the computing device 800 is moved to capture a different part of the live environment, form a different position or orientation, in the augmented reality view. FIGS. 8B and 8C provide examples of 3D viewpoints for item 808. In the examples, it is first noted that the item 808 includes richer interactive shading or shadowing 814 provided from the ambient lighting 802. As such, the use of the camera calibration methods herein, allow the item 808 to be viewed in different lighting conditions and to interact differently with the ambient lighting 802 because the image data provided for the item using the multiple cameras included such information.

As such, FIG. 8C illustrates two orientations of the computing device 820, where when the device is moved in the directions illustrated by broken lines 818, the augmented reality view changes from view 812 to view 822. Specifically, a portion of the lamp previously unseen in FIGS. 8A and 8B is now visible, because it represents a different viewpoint of the item and because it relates to a different viewpoint of the augmented reality view 822. For example, more of a side view 814 of the item 808 is provided in the view in FIG. 8C. In an example where a stored image or a stored video forms the basis for the augmented reality view, then as the stored image or stored video is rotated—either by user input sliding across the screen or by motion of the computing device 820—the item view also changes to match the rotation of the stored image or stored video. In an example, an initial viewpoint of the item is selected and the initial viewpoint is fixed to the augmented reality view at the time of selection. When the augmented reality view is changed, a proportional change from the initial viewpoint of the item is used to provide a new viewpoint of the item from the item data store (as in FIG. 7).

Figure 9:
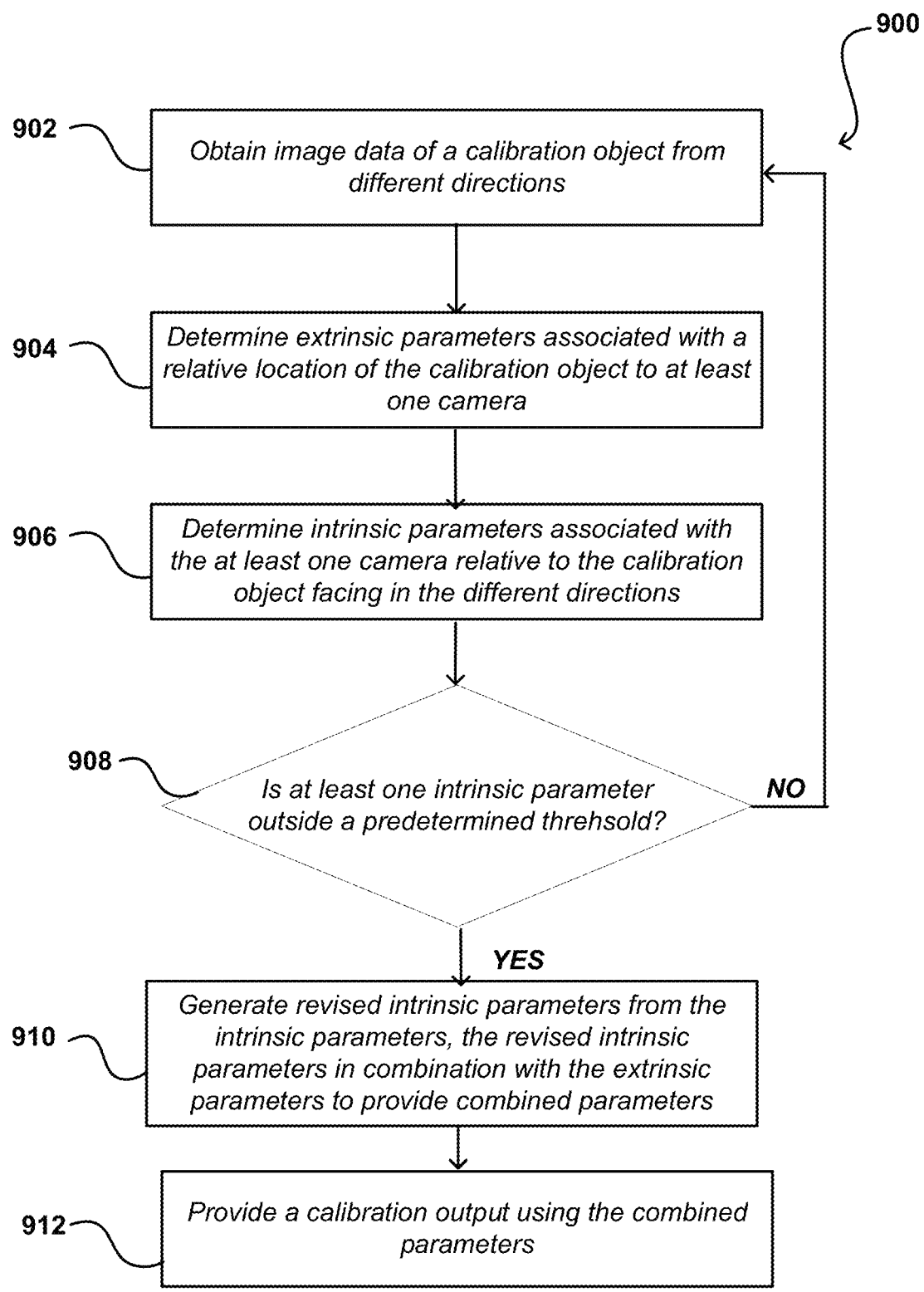
FIG. 9 illustrates an example process flow for calibration of cameras for augmented reality in accordance with various aspects of the disclosure herein.

FIG. 9 illustrates an example process flow 900 for calibration of cameras for augmented reality in accordance with various aspects of the disclosure herein. The process flow 900 may be performed using the system of FIG. 2. Sub-process 902 obtains image data of a calibration object from different directions using at least one camera. The example process 900 relies on information about a coordinate system, such as a reference coordinate system corresponding to the calibration object as obtained in the image data of sub-process 902. The calibration object can correspond to a three-dimensional checkerboard-style object, and the coordinate system can correspond to how an image of that calibration object should appear to a camera capturing an image of that object. A plurality of images can be captured as part of the image data, for example using an array of cameras as described with respect to FIG. 1. The images can include a representation of the calibration object placed on a turntable or other such surface from a number of viewpoints, for example, in a hemisphere around the calibration object.

In sub-process 904 a determination of extrinsic parameters is performed. The extrinsic parameters are associated with a relative location of the calibration object to the at least one camera. Sub-process 906 determines intrinsic parameters associated with the at least one camera relative to the calibration object facing in the different positions. For each image, initial camera calibration parameters, including the intrinsic and the extrinsic parameters, are determined for a corresponding camera using detected features or regions of the calibration object and their associated known position in the coordinate system. For example, for each image, features or regions of the calibration object can be determined and points for those features determined as calibration points or reference features of the calibration object. Positions of the features projected in the reference or calibration coordinate system can be determined using, for example, a transformation technique such as direct linear transformation techniques or other such transformation techniques. The points can be compared to the location of those points in the reference or calibration coordinate system. QR decomposition is available to separate the parameters from the coordinate system correspondences. Offset values for the points can be determined and used to determine the camera parameters, and in at least some embodiments a model (e.g., a "rectifying model") of the camera(s) capturing that image can be generated. The rectifying model can include transforms or adjustments to be made to an image captured by the cameras in order to reduce misalignment and/or distortion effects.

In sub-process 908, verification is performed to determine if at least one intrinsic parameter is outside a predetermined threshold. For example, if the skew is already determined as zero or does not affect the combined parameters, then a modification or adjustment may apply only to other intrinsic parameters, such as the principal point to generate new corresponding intrinsic parameters. When no intrinsic parameters are outside a predetermined threshold, other image data may be obtained for other positions of the calibration object and sub-processes 904 and 906 are repeated. For intrinsic parameters that are determined as outside a predetermined threshold, sub-process 910 is performed. For example, sub-process 910 generates revised versions of at least one intrinsic parameter by, for example, a modification of at least one of the intrinsic parameters determined from the example QR decomposition. The revised version of the at least one intrinsic parameter, in combination with the extrinsic parameters, provides combined parameters for a calibration output. The modification or adjustment in sub-process 910 may change the value of skew or may change the principal point to generate a revised skew and a revised principal point. The value of skew may be changed to zero and the principal point may be adjusted to the center of the image. The resulting combined parameters using the adjusted skew and/or the adjusted principal point provides a calibration output of the at least one camera. In an example, a projection matrix including the extrinsic parameters and the intrinsic parameters is determined. A portion of the projection matrix is inverted to provide an inverted representation. A QR decomposition of the inverted representation provides the combined parameters. One or more of the intrinsic parameters from the combined parameters is revised to change certain values as previously described. For example, the revision makes the one or more intrinsic parameters 99% closer to hardware specifications for one or more corresponding cameras.

The initial camera calibration parameters can be used to determine a set of global parameters. The set of global parameters can include, for example, a center of rotation of the turntable, an axis of rotation of the turntable, and a step angle of the turntable. Using the set of global parameters, re-estimation of the initial camera calibration parameters may be performed. Re-estimating the set of camera parameters includes, for example, utilizing constraints associated with the turntable setup. For example, in this embodiment, cameras perform a rotation by a common angle around a common axis, and the intrinsic parameters of each camera can be considered constant. At the re-estimation stage, adjustments or modification of the skew and/or the principal point may be performed. In this way, a global formulation of the calibration of the camera poses can be utilized. The formulation is global in that it acknowledges constraints derived from the use of a turntable system.

For example, instead of treating successive views of the turntable acquired by a give camera as if these have been in fact acquired each from an independent camera, it is recognized that each camera performs, relative to the turntable, a rotational motion around a fixed axis of rotation of the turntable. Under this formulation, each camera can be assigned a latitude, and successive views correspond to different longitudinal positions of the same camera. The angular interval between different longitudinal positions is the same across cameras. In this way, the rotation and translation components of this transformation bring the coordinate system of the calibration object into alignment with the coordinate system of the turntable or reference system. Accordingly, the coordinate system of the turntable has a center at the turntable's center of rotation, and an axis aligned with the turntable's rotation axis.

In an alternate implementation, after sub-process 910, a sub-process for determination of whether a stopping condition exists can be included. In the situation where a stopping condition does not exist, the process for camera calibration can repeat for additional images in the image data, if they exist. In another example, the re-estimated set of camera parameters can be used to re-estimate the global calibration parameters, which can be used to re-estimate the camera parameters. In an embodiment, the stopping condition can include camera parameters that satisfy at least one threshold, for example, a difference threshold or other such threshold. In the situation where a stop condition exists, for example, the difference threshold is satisfied and the camera parameters can be stored as calibrated camera parameters. Satisfying a difference threshold can include minimizing an algebraic error based at least in part on a current set of camera parameters, position information of detected features in image data, and the three-dimensional locations of corresponding features in the reference coordinate system. For example, satisfying the threshold can include determining a minimum or threshold amount of change between estimates of camera parameters. Satisfying the difference threshold may also be by modifying or adjusting certain intrinsic parameters of the global parameters to change their value during or after the re-estimation.

Figure 10:
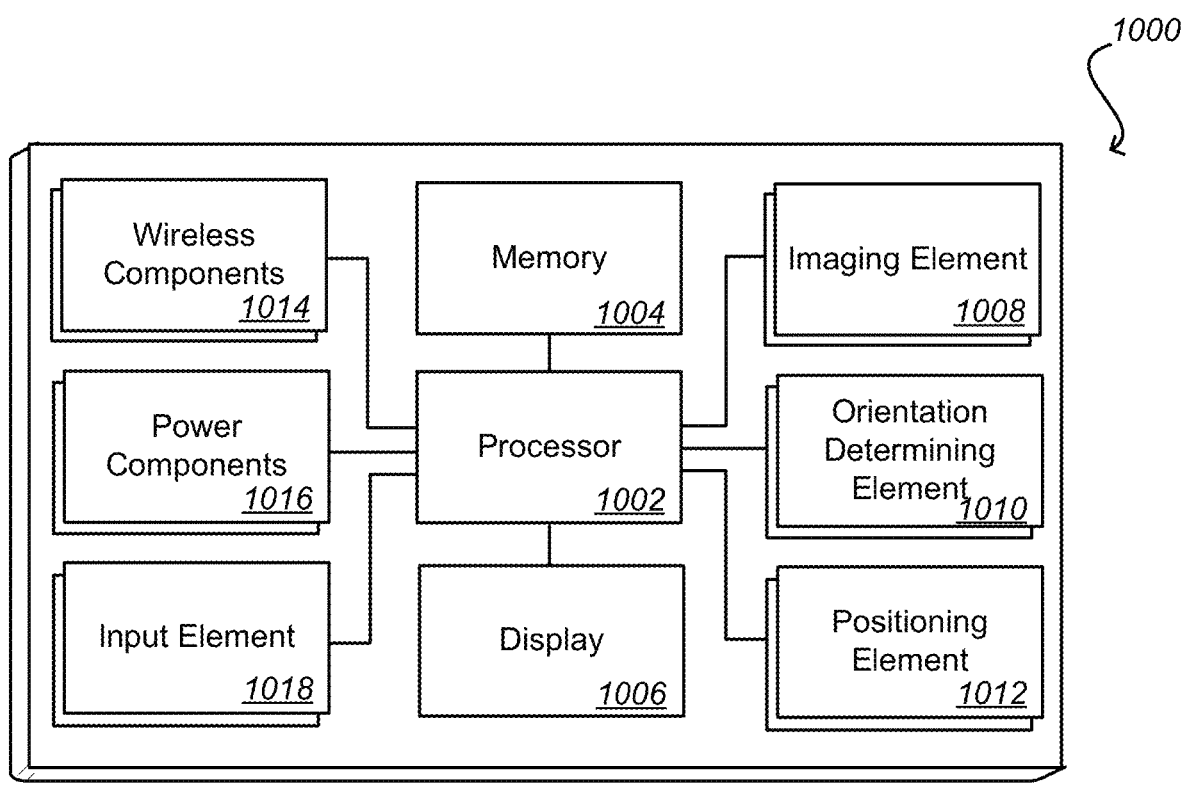
FIG. 10 illustrates an example system that can be used to implement aspects of various embodiments.
Figure 11:
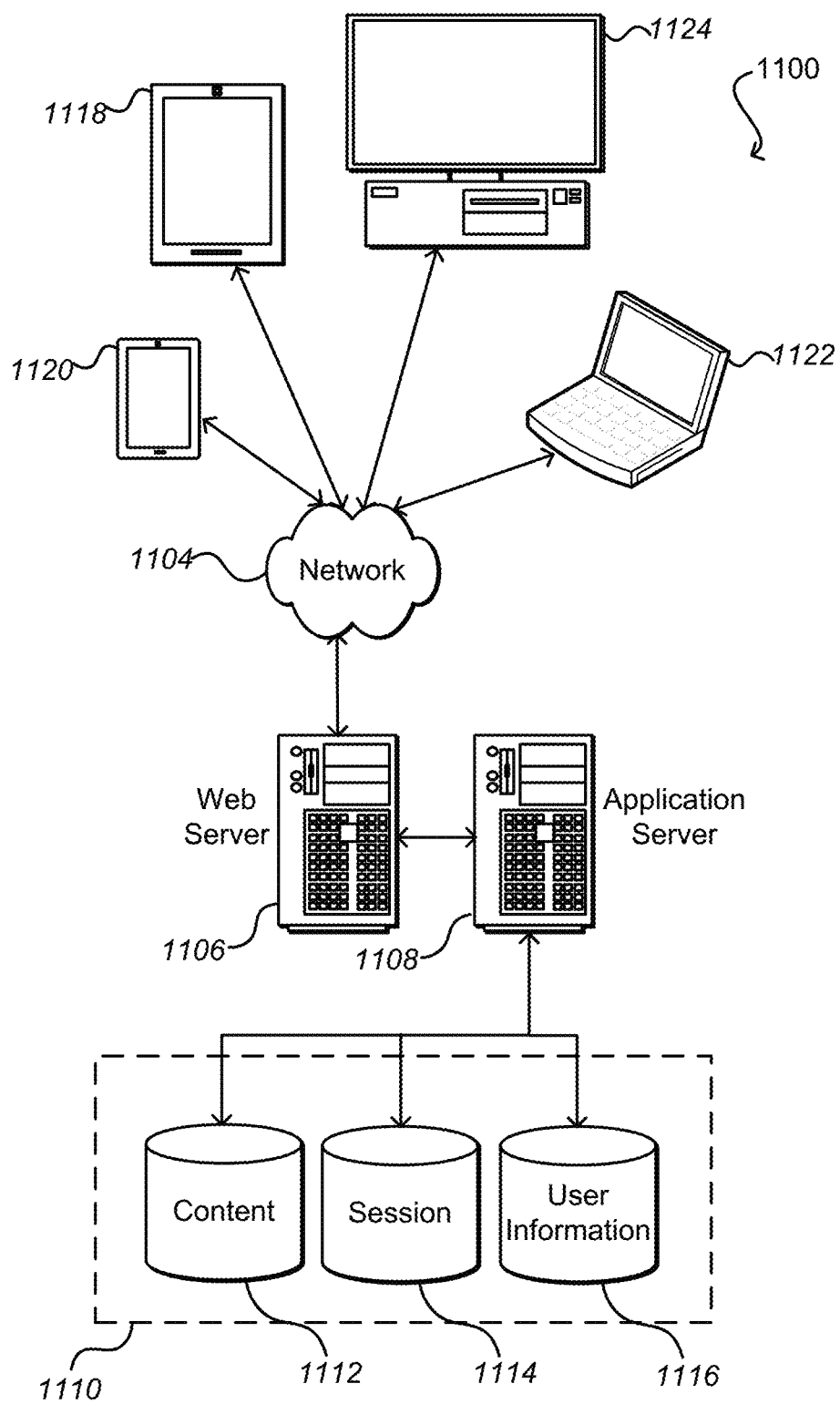
FIG. 11 illustrates an example computing environment that can be used to implement aspects of various embodiments.

FIG. 10 illustrates a set of basic components of an example computing device 1000 that can be utilized to implement aspects of the various embodiments. In this example, the device 1000 includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. The device may include at least one type of display element 1006, such as a touch screen, electronic ink (e-ink), organic light emitting diode (OLED) or liquid crystal display (LCD), although devices such as servers might convey information via other means, such as through a system of lights and data transmissions. The device typically will include one or more networking components, such as a port, network interface card, or wireless transceiver that enables communication over at least one network. The device can include at least one input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The device 1000 can include one or more imaging elements 1008. One or more orientation determining elements 1010 can determine the orientation of the device, for example in relation to a user's face or eyes. Various camera-based and other sensors 1010 can be used to determine orientation. A positioning element 1012 can determine the position of the device. The positioning element 1012 can use one or more of GPS, local network detection, Bluetooth connection, or other protocols. One or more input elements 1010 can register user input, for example input received from a touch screen display. An example device 1000 will also include power components 1016 and wireless components 1014 to communicate with other devices wirelessly.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment 1100 includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store as needed to execute aspects of one or more applications for the client device and handling a majority of the data access and business logic for an application. The application server 1108 provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server 1106. It should be understood that the Web server 1106 and application servers 1108 are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store 1110 illustrated includes mechanisms for storing content 1112 (e.g., production data) and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store. The data store 1110 is operable, through logic associated therewith, to receive instructions from the application server and obtain, update or otherwise process data in response thereto. In one example, a user might submit a search request for a certain type of item. In this case, the data store 1110 might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server 1106, 1108 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices 1118, 1120, 1122, 1124 which can be used to operate any of a number of applications. User or client devices 1118, 1120, 1122, 1124 can include any of a number of general purpose personal computers, such as desktop 1124 or laptop computers 1122 running a standard operating system, as well as cellular, wireless and handheld devices 1118, 1120 running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network 1104 that would be familiar to those skilled in the art for supporting communications using any of a variety of commercially-available protocols, such as TCP/IP, FTP, UPnP, NFS, and CIFS. The network 1104 can be, for example, a local area network, a wide-area network, a virtual private network, the Internet, an intranet, an extranet, a public switched telephone network, an infrared network, a wireless network and any combination thereof.

In embodiments utilizing a Web server 1106, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment 1100 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   at least one processor;
   a turntable;
   at least one camera; and
   a memory device including instructions that, when executed by the at least one processor, enable the computing system to:
   obtain, using the at least one camera, image data of a calibration object that comprises planar markers and that is located on the turntable to allow the at least one camera to obtain the image data from different positions of the turntable;
   determine a set of parallel planes in 3D space based at least in part on images capture by the at least one camera;
   use plane fitting to fit the set of parallel planes to trajectories of optical camera centers of the plurality of cameras;
   determine an orientation of the fitted set of parallel planes, the orientation corresponding to an axis of rotation of the turntable;
   determine extrinsic parameters comprising a rotation and a translation associated with the planar markers of the calibration object being in the different positions on the turntable, and further comprising the axis of rotation;
   determine intrinsic parameters comprising focal length, principal point, and skew for the at least one camera relative to the planar markers of the calibration object being in the different positions;
   determine that at least one of the intrinsic parameters exceeds a predetermined threshold;
   generate revised intrinsic parameters from one or more of the focal length, the principal point, and the skew of the intrinsic parameters, wherein the revised intrinsic parameters do not exceed the predetermined threshold;
   determine calibration output including the revised intrinsic parameters in combination with the extrinsic parameters; and
   utilize the calibration output to provide a rendering of a virtual item in an augmented reality view of a live environment.

2. The computing system of claim 1, wherein the instructions, when executed by the at least one processor, further enable the computing system to:
   determine a projection matrix comprising the extrinsic parameters and the intrinsic parameters;
   invert a portion of the projection matrix to provide an inverted representation;
   perform QR decomposition of the inverted representation to provide parameters, which are modified to generate the revised intrinsic parameters.

3. The computing system of claim 1, wherein the instructions, when executed by the at least one processor, further enable the computing system to:
   modify the principal point so that a modified principal point is located at a center of a calibration image provided in the image data, the modified principal paint used to determine the calibration output.

4. The computing system of claim 1, wherein the instructions, when executed by the at least one processor, further enable the computing system to:
   modify the skew so that a modified skew of zero (0) is used to determine the calibration output.

5. The computing system of claim 1, wherein the instructions, when executed by the at least one processor, further enable the computing system to:
   obtain the image data using at least one RGBD sensor and at least one RGB sensor.

6. The computing system of claim 5, wherein the instructions, when executed by the at least one processor, further enable the computing system to:
   apply the calibration output to calibrate a portion of the augmented reality view associated with the at least one RGBD sensor without affecting portions of the augmented realty view associated with the at least one RGB sensor.

7. A system, comprising:
   at least one processor;
   at least one camera;
   a memory device including instructions that, when executed by the at least one processor, enable the system to:
   obtain, using the at least one camera, image data of a three-dimensional (3D) calibration object from different directions;
   determine a set of parallel planes in 3D space based at least in part on images capture by a plurality of cameras;
   use plane fitting to fit the set of parallel planes to trajectories of optical camera centers of the plurality of cameras;
   determine an orientation of the fitted set of parallel planes, the orientation corresponding to an axis of rotation of a turntable providing a resting surface for the 3D calibration object;
   determine extrinsic parameters associated with a relative position of features of the 3D calibration object to the at least one camera, and further including the axis of rotation;

determine intrinsic parameters associated with the at least one camera relative to the 3D calibration object facing in the different directions;

generate revised intrinsic parameters from the intrinsic parameters, the revised intrinsic parameters in combination with the extrinsic parameters providing combined parameters; and provide a calibration output using the combined parameters.

8. The system of claim 7, wherein the instructions, when executed further enable the system to:

detect the features associated with planar markers on the 3D calibration object;

obtain information for a 3D coordinate system from the features; and associate two-dimension coordinates for the at least one camera to the 3D coordinate system.

9. The system of claim 7, wherein the intrinsic parameters comprise at least one of a focal length, a principal point, and a skew, and the extrinsic parameters comprise at least one of position and camera orientation.

10. The system of claim 7, wherein the different positions are obtained from the 3D calibration object positioned on a turntable, and wherein the image data includes a plurality of images captured from a plurality of cameras positioned with respect to the turntable.

11. The system of claim 7, wherein the features of the 3D calibration object comprises at least one of a checkerboard style pattern, data matrices, regions of different intensities, color patterns, text, markings, or salient points.

12. The system of claim 7, wherein the image data includes a plurality of images, and wherein the instructions, when executed further enable the system to:

for individual images of the plurality of images, use a feature detection technique to determine the features of the 3D calibration object, the features associated with position of the 3D calibration object relative to a camera coordinate system.

13. The system of claim 7, wherein the image data includes a plurality of images, and wherein the instructions, when executed further enable the system to:

analyze the image data to detect the features of the 3D calibration object represented in the image data, the features associated with position of the 3D calibration object relative to a camera coordinate system;

associate the features to known 3D positions of corresponding features of the 3D calibration object in a reference coordinate system; and use plane fitting to determine a set of parallel 3D planes in the reference coordinate system based at least in part on the known 3D positions.

14. The system of claim 7, wherein the instructions, when executed further enable the system to:

use shape fitting to fit a sphere to optical camera centers of at least two cameras; and determine a center of the sphere, the center corresponding to a center of a turntable providing a resting surface for the 3D calibration object, the center providing part of the extrinsic parameters.

15. The system of claim 7, wherein the instructions, when executed further enable the system to:

use shape fitting to fit a set of concentric circles to optical camera centers of at least two cameras; and determine a center of the concentric circles, the center corresponding to a center of a turntable providing a resting surface for the 3D calibration object, the center providing part of the extrinsic parameters.

16. The system of claim 4, wherein the instructions, when executed further enable the system to:

compare the extrinsic parameters and the extrinsic parameters to new intrinsic parameters and new extrinsic parameters to determine an amount of change;

compare the amount of change to a threshold; and determine whether to use the new intrinsic parameters and the new extrinsic parameters based at least in part on the amount of change.

17. A method, comprising:

obtaining, using the at least one camera, image data of a three-dimensional (3D) calibration object from different directions;

determining a set of parallel planes in 3D space based at least in part on images capture by a plurality of cameras;

using plane fitting to fit the set of parallel planes to trajectories of optical camera centers of the plurality of cameras;

determining an orientation of the fitted set of parallel planes, the orientation corresponding to an axis of rotation of a turntable providing a resting surface for the 3D calibration object;

determining extrinsic parameters associated with a relative position of features of the 3D calibration object to the at least one camera, and further including the axis of rotation;

determining intrinsic parameters associated with the at least one camera relative to the features of the 3D calibration object facing in the different directions;

generating revised intrinsic parameters from the intrinsic parameters, the revised intrinsic parameters in combination with the extrinsic parameters providing combined parameters; and provide a calibration output using the combined parameters.

18. The method of claim 17, further comprising:

detecting the features associated with planar markers on the 3D calibration object;

obtaining information for a 3D coordinate system from the features; and associating two-dimension coordinates for the at least one camera to the 3D coordinate system.

19. The method of claim 17, wherein the intrinsic parameters comprise at least one of a focal length, a principal point, and a skew, and the extrinsic parameters comprise at least one of position and camera orientation.

* * * * *